(12) United States Patent
Mazzagatti et al.

(10) Patent No.: US 7,213,041 B2
(45) Date of Patent: May 1, 2007

(54) SAVING AND RESTORING AN INTERLOCKING TREES DATASTORE

(75) Inventors: Jane Campbell Mazzagatti, Blue Bell, PA (US); Jane Van Keuren Claar, Bethlehem, PA (US)

(73) Assignee: Unisys Corporation, Blue Bell, PA (US)

( * ) Notice: Subject to any disclaimer, the term of this patent is extended or adjusted under 35 U.S.C. 154(b) by 389 days.

(21) Appl. No.: 10/958,830

(22) Filed: Oct. 5, 2004

(65) Prior Publication Data

US 2006/0074939 A1  Apr. 6, 2006

(51) Int. Cl.
 *G06F 17/30* (2006.01)
(52) U.S. Cl. .................. 707/204; 707/203; 707/205; 707/100
(58) Field of Classification Search ........ 707/203–205, 707/100; 711/162, 203
 See application file for complete search history.

(56) References Cited

U.S. PATENT DOCUMENTS

| | | | |
|---|---|---|---|
| 4,286,330 A | 8/1981 | Isaacson | |
| 5,245,337 A | 9/1993 | Bugajski | |
| 5,293,164 A | 3/1994 | Bugajski | |
| 5,592,667 A | 1/1997 | Bugajski | |
| 5,630,125 A | 5/1997 | Zellweger | |
| 5,829,004 A | 10/1998 | Au | |
| 5,963,965 A | 10/1999 | Vogel | |
| 5,966,709 A | 10/1999 | Zhang | |
| 5,978,794 A | 11/1999 | Agrawal et al. | |
| 5,983,232 A | 11/1999 | Zhang | |
| 6,018,734 A | 1/2000 | Zhang | |
| 6,029,170 A | 2/2000 | Garger | |
| 6,031,993 A | 2/2000 | Andrews et al. | |
| 6,102,958 A | 8/2000 | Meystel | |
| 6,115,715 A | 9/2000 | Traversat et al. | |
| 6,138,115 A | 10/2000 | Agrawal et al. | |
| 6,138,117 A | 10/2000 | Bayardo | |
| 6,160,549 A | 12/2000 | Touma et al. | |
| 6,275,817 B1 | 8/2001 | Reed et al. | |

(Continued)

FOREIGN PATENT DOCUMENTS

EP  0 079 465  1/1985

(Continued)

OTHER PUBLICATIONS

Gschia-Yuan Teng & David L. Neuhoff, "An Improved Hierarchical Lossless Text Compression Algrithm", Proceedings 1995 Data Compression Conference.

(Continued)

*Primary Examiner*—Cam-Y Truong
(74) *Attorney, Agent, or Firm*—Richard J. Gregson; Mark T. Starr

(57) ABSTRACT

A tree-based datastore comprising a forest of interconnected trees that can be generated and/or accessed may require specialized saving and restoring processes to ensure that all the links are properly maintained whether it will be restored in full or in part. A previous process acted on known features of the trees based datastore to generate a file of metadata and packetize each of the nodes of the structure, carefully saving the links and lists of links with old memory addresses accounted for. This shows how to build a save file without saving all links, using a new restore process to restore the links instead.

11 Claims, 13 Drawing Sheets

U.S. PATENT DOCUMENTS

| | | | |
|---|---|---|---|
| 6,278,987 B1 | 8/2001 | Reed et al. |
| 6,286,002 B1 | 9/2001 | Axaopoulos et al. |
| 6,341,281 B1 | 1/2002 | MacNicol et al. |
| 6,360,224 B1 | 3/2002 | Chickering |
| 6,381,600 B1 | 4/2002 | Lau |
| 6,389,406 B1 | 5/2002 | Reed et al. |
| 6,394,263 B1 | 5/2002 | McCrory |
| 6,453,314 B1 | 9/2002 | Chan et al. |
| 6,470,277 B1 | 10/2002 | Chin et al. |
| 6,473,757 B1 | 10/2002 | Garofalakis et al. |
| 6,499,026 B1 | 12/2002 | Rivette et al. |
| 6,505,184 B1 | 1/2003 | Reed et al. |
| 6,581,063 B1 | 6/2003 | Kirkman |
| 6,604,114 B1 | 8/2003 | Toong et al. |
| 6,615,202 B1 | 9/2003 | Ding et al. |
| 6,624,762 B1 | 9/2003 | End, III |
| 6,662,185 B1 | 12/2003 | Stark et al. |
| 6,681,225 B1 | 1/2004 | Uceda-Sosa et al. |
| 6,684,207 B1 | 1/2004 | Greenfield et al. |
| 6,691,109 B2 | 2/2004 | Bjornson et al. |
| 6,745,194 B2 | 6/2004 | Burrows |
| 6,748,378 B1 | 6/2004 | Lavender et al. |
| 6,760,720 B1 | 7/2004 | De Bellis |
| 6,769,124 B1 | 7/2004 | Schoening et al. |
| 6,804,688 B2 | 10/2004 | Kobayashi et al. |
| 6,807,541 B2 | 10/2004 | Bender et al. |
| 6,816,856 B2 | 11/2004 | Baskins et al. |
| 6,826,556 B1 | 11/2004 | Miller et al. |
| 6,831,668 B2 | 12/2004 | Cras et al. |
| 6,868,414 B2 | 3/2005 | Khanna et al. |
| 6,895,490 B1 * | 5/2005 | Moore et al. ............... 711/203 |
| 6,900,807 B1 | 5/2005 | Liongosari et al. |
| 6,931,401 B2 | 8/2005 | Gibson et al. |
| 6,952,736 B1 | 10/2005 | Westbrook |
| 6,965,892 B1 | 11/2005 | Uceda-Sosa et al. |
| 2002/0124003 A1 | 9/2002 | Rajasekaran et al. |
| 2002/0138353 A1 | 9/2002 | Schreiber et al. |
| 2002/0188613 A1 | 12/2002 | Chakraborty et al. |
| 2002/0194173 A1 | 12/2002 | Bjornson et al. |
| 2003/0033279 A1 | 2/2003 | Gibson et al. |
| 2003/0093424 A1 | 5/2003 | Chun et al. |
| 2003/0115176 A1 | 6/2003 | Bobroff et al. |
| 2003/0120651 A1 | 6/2003 | Bernstein |
| 2003/0177149 A1 * | 9/2003 | Coombs ................. 707/204 |
| 2003/0204513 A1 | 10/2003 | Bumbulis |
| 2003/0204515 A1 | 10/2003 | Shadmon et al. |
| 2004/0107186 A1 | 6/2004 | Najork et al. |
| 2004/0133590 A1 | 7/2004 | Henderson et al. |
| 2004/0143571 A1 | 7/2004 | Bjornson et al. |
| 2004/0230560 A1 | 11/2004 | Elza et al. |
| 2004/0249781 A1 | 12/2004 | Anderson |
| 2005/0015383 A1 | 1/2005 | Harjanto |
| 2005/0050054 A1 | 3/2005 | Clark et al. |
| 2005/0071370 A1 | 3/2005 | Atschul et al. |
| 2005/0080800 A1 | 4/2005 | Parupudi et al. |
| 2005/0097108 A1 | 5/2005 | Wang et al. |
| 2005/0102294 A1 | 5/2005 | Coldewey |
| 2005/0149503 A1 | 7/2005 | Raghavachari |
| 2005/0171960 A1 | 8/2005 | Lomet |
| 2005/0262108 A1 | 11/2005 | Gupta |

FOREIGN PATENT DOCUMENTS

| | | |
|---|---|---|
| WO | WO 95/17783 | 6/1995 |
| WO | W/O 02/063498 | 8/2002 |
| WO | WO 02/063498 | 8/2002 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

* cited by examiner

| Node packet Type 2 220 | |
|---|---|
| Packet Length | 211 |
| Case pointer | 212 |
| Result pointer | 213 |
| Additional fields … | 214 |
| Old node address | 215 |

Fig. 3

Node packet Type 1 200

| | |
|---|---|
| Packet Length | 201 |
| Case pointer | 202 |
| Result pointer | 203 |
| Additional fields ... | 204 |
| asCase pointer list count | 205 |
| asResult pointer list count | 206 |
| Old node address | 207 |

Fig. 4

Node packet Type 3  230

| |
|---|
| Packet Length  231 |
| Case pointer  232 |
| Result pointer  233 |
| Additional fields ...  234 |
| Pointer List Count  235 |
| Old node address  237 |

Address Translation Table 30

| Old memory address 1 _31a_ | New memory address 1 _32a_ |
|---|---|
| Old memory address 2 | New memory address 2 |
| Old memory address 3 | New memory address 3 |
| Old memory address 4 | New memory address 4 |
| Old memory address 5 | New memory address 5 |
| Old memory address 6 | New memory address 6 |
| Old memory address 7 | New memory address 7 |
| Old memory address 8 | New memory address 8 |
| Old memory address 9 | New memory address 9 |
| ... | ... |

31 ↗    32 ↙

SAVING AND RESTORING AN INTERLOCKING TREES DATASTORE

RELATED APPLICATIONS

This application shares substantial disclosure with patent application Ser. No. 10/759,466 filed on Jan. 16, 2004 and shares a common inventor with this Patent Application.

FIELD OF THE INVENTION

This invention relates to the field of manipulation of interlocking trees datastores, particularly to allowing for saving and retrieval of interlocking trees datastores, and more particularly to improvements for providing saving and retrieval of particular interlocking trees datastores.

BACKGROUND OF THE INVENTION

Saving and restoring the knowledge store or KStore that is an interlocking trees datastore can be an important feature in the commercialization of such datastores. In experimental trials we have reduced time required to save and restore KStores by several orders of magnitude, and the memory size needed, applying the principles we teach herein.

We have developed a system and various methods for creating and using interlocking trees datastores. In particular, these structures and methods have been described in copending patent applications U.S. Ser. Nos. 10/385,421, and 10/666,382, by inventor Mazzagatti. Additionally, we described a system in which such interlocking trees datastores could more effectively be used in U.S. Ser. No. 10/879,329. While the system and method we describe in this patent relate with particularity to the specific interlocking trees datastores which inventor Mazzagatti hereof described in the above-referenced patent (applications), the system and methods described herein may also be applicable to similar structures.

There are of course other uses for saved interlocking trees datastores. With the use of partial saves, or "partitions" of a whole interlocking trees datastore, there are even more uses. Therefore, one could use a save and restore process to do things such as saving interlocking trees datastores (or saving partial interlocking trees datastores) that have been built on one machine into multiple computing machines for similar but distributed or independent contemporaneous uses, for just one example. To put a real-world view on this, one can see knowledge-filled interlocking trees datastores being saved from a central machine and restored into cash registers across a nationwide company handling queries on inventory at point of sale without recourse to a central repository. One can see saving course material or sample knowledge bases for student use or modification on their individual computers. For any such uses, the save and restore processes we describe that are responsive to these needs can be used to move an interlocking trees datastores, and partial saves thereof, from any memory to any other.

While the interlocking trees datastores structure created by the system originally described in co-pending patent application U.S. Ser. No. 10/385,421 provides many useful traits for relating the data to itself in various ways, and for generating results to various inquiries without the need to generate special structures to obtain the results, heretofore there have been fundamental limits on its usefulness. One of the limitations was that the data structure in memory in a computer works while in place, but was not amenable to moving, or to saving and subsequent restoration. We previously had to re-teach, that is, re-create (or, more exactly, allow our inventive systems to re-create) an entire new copy or instantiation of the interlocking trees datastore every time we needed to move it or needed to shut down the computer system in which it existed. Thus, the availability of portability and longevity for interlocking trees datastores despite computer system failure were unavailable to the interlocking trees datastores prior to this development.

Given that the data structure we created did not exist in computer systems prior to our development, we found little in the way of prior designs for such systems to accommodate our need. Accordingly we were forced to design a specific way to save our structure so that it could be restored without losing the connections that make it what it is; that is, the pointer structure needed to be restored correctly, despite the changed address space in new systems into which it might be ported or in the same computer system from which it was saved and to which it needed to be restored. The elemental root nodes needed their data retained and access to their pointers into the structure restored. All of the nodes needed to have the same access to their pointers, even though they may all later be restored to different addresses, and we needed to accomplish this in an OS-independent and machine-independent way so that the interlocking trees datastore could be used in any computer environment.

Generally, a forest of interconnecting trees datastore is generated and/or accessed in a manner we have described before in earlier patent documents. The tree-based datastore comprises a first tree that depends from a first root node and may include a plurality of branches. Each of the branches of the first tree ends in a leaf node. Each leaf node may represent an end product, or a subcomponent node. A second root of the same tree-based datastore is linked to each leaf node representing an end product. Finally, the tree-based datastore comprises a plurality of trees in which the root node of each of these trees can be described as an elemental node. The root node of each of these trees may be linked to one or more nodes in one or more branches of the first tree. The nodes of the tree-based datastore contain only pointers to other nodes in the tree-based datastore, and may contain additional fields wherein one such may be a count field. Additionally, means to get probabilities of the coincidence of variables related to particular nodes as identified by desired contexts within one or more defined foci are described. Further, the application of logical operators to queries regarding such variables is shown.

After working with the save and restore system we describe in co-pending application Ser. No. 10/759,466, we discovered that we could operate save and restore significantly more efficiently. Accordingly, we describe those findings herein, along with some of the original disclosure from that application.

SUMMARY OF THE INVENTION

In order to save and be able to restore a tree-based datastore comprising one or more levels of forests of interconnected trees that is, preferably generated and/or accessed by an innate learning process similar to or the same as what we described in U.S. patent application Ser. No. 10/385,421, the supporting structures, the organization of the nodes, and specific elemental data needs to be saved.

The SAVE/RESTORE process as described before was very slow for large K data stores. In many cases it is faster to recreate the K from the original data.

The new method does not SAVE the asCase and asResult lists. These lists can be reconstructed with the RESTORE of each individual node. That is, as a node is RESTOREd the new node address is stored in the asCase list of the Case pointer and in the asResult list of the Result pointer.

Another important aspect of the new method is that it requires only one pass through the data in the RESTORE phase, instead of two passes in the original method, Ser. No. 10/759,466. As is described in earlier patents on the preferred interlocking trees datastore, each level of the tree-based datastore comprises a first tree that depends from a first root node and may include a plurality of branches. The first root may represent a concept, such as but not limited to, a level begin indicator. Each of the branches of the first tree ends in a leaf node or end product node. A second root of the same level of the tree-based datastore is linked to each leaf node of the first tree that represents an end product. Hence, the second root is essentially a root to an inverted order of the first tree or subset of the first tree, but the first tree is not duplicated. The second root may represent a concept, such as but not limited to, a level end indicator. Finally, the tree-based datastore comprises a plurality of trees in which the root node of each of these trees may include data such as a dataset element or a representation of a dataset element. This type of root node is referred to herein as an elemental root node. The elemental root node of each of these trees may be linked to one or more nodes in one or more branches of the unduplicated first tree. The non-root nodes of the tree-based datastore essentially contain only pointers to other nodes in the tree-based datastore, and may contain additional fields wherein one such additional field may be a count field. The roots of the trees in the forest of trees comprising each level of the tree-based datastore are also comprised of pointers, however the elemental root nodes may, in addition, contain data that represents information (i.e., contain data that is or represents data such as dataset elements or concepts such as level begin or level end indicators); all the other nodes of the tree-based datastore only point to other nodes and contain essentially no data. In one embodiment the data is an integer that is associated with a character, a pixel representation, a condition such as begin indicator, end indicator, beginning of field indicator or the like, although the interlocking trees datastore is not so limited. Multiple levels of the above-described tree-based datastore may be generated and accessed; the end products of a lower level becoming the elemental root nodes of the next level. In this Save and Restore invention, we use the levels to guide the process as described in detail within.

The structure of the nodes themselves is generally maintained through a limited set of data fields per node. There are fields for the Case, the Result, the asCase list pointer, the asResult list pointer and additional fields including at least a count field in most forms of the structure, as well as a value field for each elemental root node.

In order to save the structure as set forth above and as described in greater detail in the above-listed co-pending patent applications, incorporated hereinto by this reference in their respective entireties, the supporting structures should be saved, but depending upon what kind of restore is planned, some of these may be lost without harm. The supporting structures will vary depending of course upon the form of the interlocking trees datastore we are saving and how we intend to restore it.

The entire interlocking trees datastore structure itself must then be traversed by a saving engine that accesses each node, and from the information in each node, creates a node packet for saving. In preferred embodiments, the node packet will contain metadata created by the saving engine including, preferably for example, the length of the packet for the node. The engine will then save the node packet to permanent memory or whatever memory we are saving the interlocking trees datastore to, whether in the machine it was formed in or in any other machine or memory system. Such memories can be of a type that is relatively permanent, a memory local to the machine housing said one memory, a distant memory in a system accessible through a network, a partition memory in a partitioned machine, another part of said one memory. Eventually, in most cases we anticipate we will restore the interlocking trees datastore (or any saved part thereof) to an active memory, whether it is in the original machine or in some other machine so that it can provide functionality. We discuss later how the metadata can be otherwise stored than in the packet itself We also discuss how to organize the storage of packets in a preferred form, as node packets within larger packets.

In our original concepts for determining which supporting structures need to be saved, some choices include a file header containing a creation date (for the save), a file ID, a list of values for what we like to call "sensors" but what we commonly describe as elemental root nodes or their addresses which point to their values, a list of strings representing the end product nodes of the structure (because they represent all the "thoughts" or strings of nodes within the forests of interlocking trees datastore), any needed metadata which might describe the data structures of the underlying OS or computer system in which it resides, password protection if any, how lists of pointers are ordered in the nodes, and any information of that nature if needed to restore the structure or determine the addresses of information in the structure which is being saved. Additionally the header may save, K state variables (such as how many additional fields are supported in a node, what kinds of queries may be going on, how the asCase list and asResult lists are structured, data sources, switches and data streams) and/or data sources descriptors such as hooks identifying what sources to accept queries and or get information from and the like. Data about all these items could be in a single header or all or some of it could be in little headers for each packet or for packets that use particular items, or in some cases none of this information needs to be saved at all. One of ordinary skill in programming arts will understand that a system can be assumed based on a known environment or the like which may make keeping such data irrelevant in certain circumstances. In other words, much of this metadata may be redundant if the environment of the saved K and the restored K will be identical or quite similar. (A "data stream" is a term indicating a data set and its related input sources whether it be static or dynamic).

In attempting to make the process more efficient, we discovered that we don't have to save the pointers for the asCase and asResult lists, (although saving the number of pointers on the lists may help make the Restore more efficient). However, this improvement generally operates smoothly using the current technology only if we save nodes in the right sequence, i.e., so that the nodes having asCase and asResult lists are processed before the nodes they point to. We simply start with the lowest level of the interlocking trees structure and move to subsequent (higher) levels after saving all the nodes at the lowest levels, starting with the nodes having asCase pointers (BOT and subcomponent nodes) and asResult pointers (root nodes), and then moving to higher levels starting on such levels with the same kinds of nodes.

We describe how to use three new kinds of node packets for this improved save and restore system, which we refer to as packet types 1, 2 and 3 in this patent. In a preferred embodiment we indicate the type of node packet in supporting structures being saved with the interlocking trees datastore structure. Alternatively, a designator for the node packet type may be stored in the additional field of the node. There can be some confusion as to terminology as to what a Type is, and we provide a key in the detailed description to clarify when we are talking about types of nodes and packets, and whether the taxonomy depends upon what is in the nodes' "fields" or in the packet organization.

Type 1 node packets contain the current or old node address, the Case and Result pointers, any "additional fields," the count of asCase list pointers and the count of asResult list pointers. Type 1 packets may also have information on the size of the packet and an indication of the node packet type. The reason we may want the the list counts is that when the saved K is being Restored, we will need to allocate enough space for the lists in the memory of the target machine that will hold the restored K, and the number of pointers (each requiring some indication of address) will impact this size requirement significantly. The absolute number of nodes will be another major contributor to size allocation requirements, but if we need to allocate memory area for individual nodes, that requirement will be mostly the pointer list size.

Type 2 packets, contain the Case and Result pointers, any additional fields, the current or old node address, and could also have information on the size of the packet and packet type, thus leaving out the count of asCase list pointers and the count of asResult list pointers. Node packets Type 1 and Type 2 may be used in varying circumstances as described below, but it should be understood that they could be chosen based on the user's needs or preferences.

The third type, Type 3, recognizes that a node will have only an asCase or an asResult list and not both in our interlocking trees datastore. Accordingly it contains the current or old node address, the Case and Result pointers, any "additional fields," and one pointer list count field, thus saving the memory space which would otherwise be required for having both an asCase and an asResult pointer list fields. Type 3 packets may also contain information on the size of the packet and packet type. The packet type information may include an indication of which pointer list, asCase or asResult, has been included in the packet. If the packet does not contain information about which type of pointer list is in the packet, the pointer list will be considered an asReference type and the Restore and/or other KStore processes will determine that.

Node packets Type 1, Type 2 and Type 3 may be used in varying circumstances; in fact, they can be used together in a single Save/Restore operation, so long as the Type 1 is used for one kind of node and the Type 2 is used for another. It is unlikely that we will use three Types together in a single saved K because that requires programming in additional steps in the algorithm that will create the node packets to decide which of the two types a given node is, and this slows down processing for little or no gain we can perceive at this time. However, it should be noted that a Restore routine can take saved Ks consisting of different node packet types, for example a saved K1 with packet Type 1 and a saved K2 with node packets of Type 2, and restore them into a single new K As with our previous Save and Restore patent application, the size of the packet is preferably just determined each time a new packet is prepared for storage or stored, preferably by whatever mechanism is used to establish the packet. Its total memory length, given normal programming constraints and practices, is placed into the header or otherwise saved for the whole interlocking trees datastore memory area. In some embodiments, all are given a same length to avoid this step, and any surplus space is ignored in the save of such embodiments. We also disclose the use of packets within packets to better organize saves in this patent.

Traversing the structure can be done in different ways in order to access all the nodes. One can start from the primary root nodes and traverse along the asCase paths, or from the end product nodes and follow the backward Case links until all primary root nodes are located, or from each of the root nodes, following asResult links from each. As mentioned above, if using a Type 1 or Type 3 packet to store node information during a Save operation, it would be preferred to start from the node with the asCase list, here the BOT node.

We could also traverse the structure of K by starting with each of the root nodes on the lowest level and following all the asResult pointers. Similar considerations as we just mentioned for Type 1 and Type 3 packets apply.

By saving properly, we also enable the restoration of partial interlocking trees datastores, which can retain the usefulness of the full structure's knowledge without its bulk for particular applications. Generally, if we wish to constrain a fully developed interlocking trees datastore, we can save it by only traversing the parts within the constraints of interest and do a restore of all that is saved. Thus, for example, we can eliminate all data that has end product nodes of no continuing interest to us through this process. Other kinds of partial saves are not presently recommended. However, we believe we will develop appropriate partial save techniques other than this in the future. Also, we can reduce the number of nodes we save if we do not save nodes with counters having a null, small or even a negative value.

Restoring the structure requires allocating the memory needed for the restore and reading the supporting structures that have been saved. Each node packet should be read and memory allocated, while constructing an address translation table. The address translation table is used to convert the old memory addresses to new memory addresses for each node. Each node is then reconstructed with its defining Case and Result pointers, and other associated data and asCase and asResult pointer lists of the Case and Result nodes are repopulated with the new memory address of the current node. The K structure will have then been restored. Alternatively, one could store relative addresses and restore with just the base relative address.

End product nodes of one level of a KStore structure may be the root nodes that are combined to generate a next level of subcomponent nodes. This process can be repeated any number of times, creating any number of levels of asCase trees. Additionally, nodes of a level may be traversed through Result pointers to see their related lower level nodes and roots. End product nodes of one level become the root nodes for the next higher level through its asResult tree, that is, the asResult tree of the lower level having the root node that represents the lower level ending indicator (EOT).

In some cases, end product nodes from each level will be identified as they are created. The metadata this creates is part of the metadata about the interlocking trees datastore structure that could be saved where we want to do a partial save of only higher levels, for example.

BRIEF DESCRIPTION OF THE DRAWINGS

The foregoing summary, as well as the following detailed description of embodiments of the invention, is better understood when read in conjunction with the appended drawings.

For the purpose of illustrating the invention, there is shown in the drawings exemplary constructions of the invention; however, the invention is not limited to the specific methods and instrumentalities disclosed. In the drawings:

FIGS. 3–5 are block diagrams of node packets in accordance with various preferred embodiments of the invention;

FIG. 8 is a block diagram illustrating a preferred form of Address Translation Table for use in accord with the invention;

DETAILED DESCRIPTION OF ILLUSTRATIVE EMBODIMENTS

Overview

Although we have described in previously mentioned patent applications a system and method for creating an interlocking trees datastore, which we now call KStore, we feel it necessary to repeat some of the description in order to familiarize the reader with the concepts which the present invention takes for granted as existing technology, but we believe these concepts are found nowhere else in the computer data arts. The KStore generally comprises at least one level of a forest of interconnected trees. Construction of each level of the forest of interconnected trees of the datastore, captures information about a data stream by creating new nodes representing sequences of elements from an elemental dataset As each element is encountered in the data stream a new subcomponent node component is constructed using a reference to the previous subcomponent node and a reference to a elemental root node. If a new sequence is being constructed, the references would be to a level beginning of thought indicator (included in the set of element nodes) and an elemental root. If the end of the sequence has been encountered, the references would be to a subcomponent node and a node representing a level end of thought indicator. This iterative process results in the generation of a single asCase tree composed of nodes linked by asCase tree branches and multiple asResult trees. The nodes of the asCase branches depend from a first root. For example, referring to FIG. 11, nodes 1050, 1002, 1004, 1024, 1026, 1027, and 1030 is an exemplary asCase tree depending from a first begin indicator root 1050. Other branches starting with node 1005 will also be considered part of this asCase tree, including but not limited to 1028, 1029, 1040, 1031, and 1060. AsResult tree examples include the following trees: node 1051, and 1002 (one asResult tree), nodes 1053, and 1003 and 1005 (a second example asResult tree), and nodes 1057, 1033, 1031, and 1027 (a third example asResult tree) which among many others can be found in this diagram. The right side asResult tree is a special instance of asResult tree because the root (node 1061) represents an end indicator.

Figure 10:
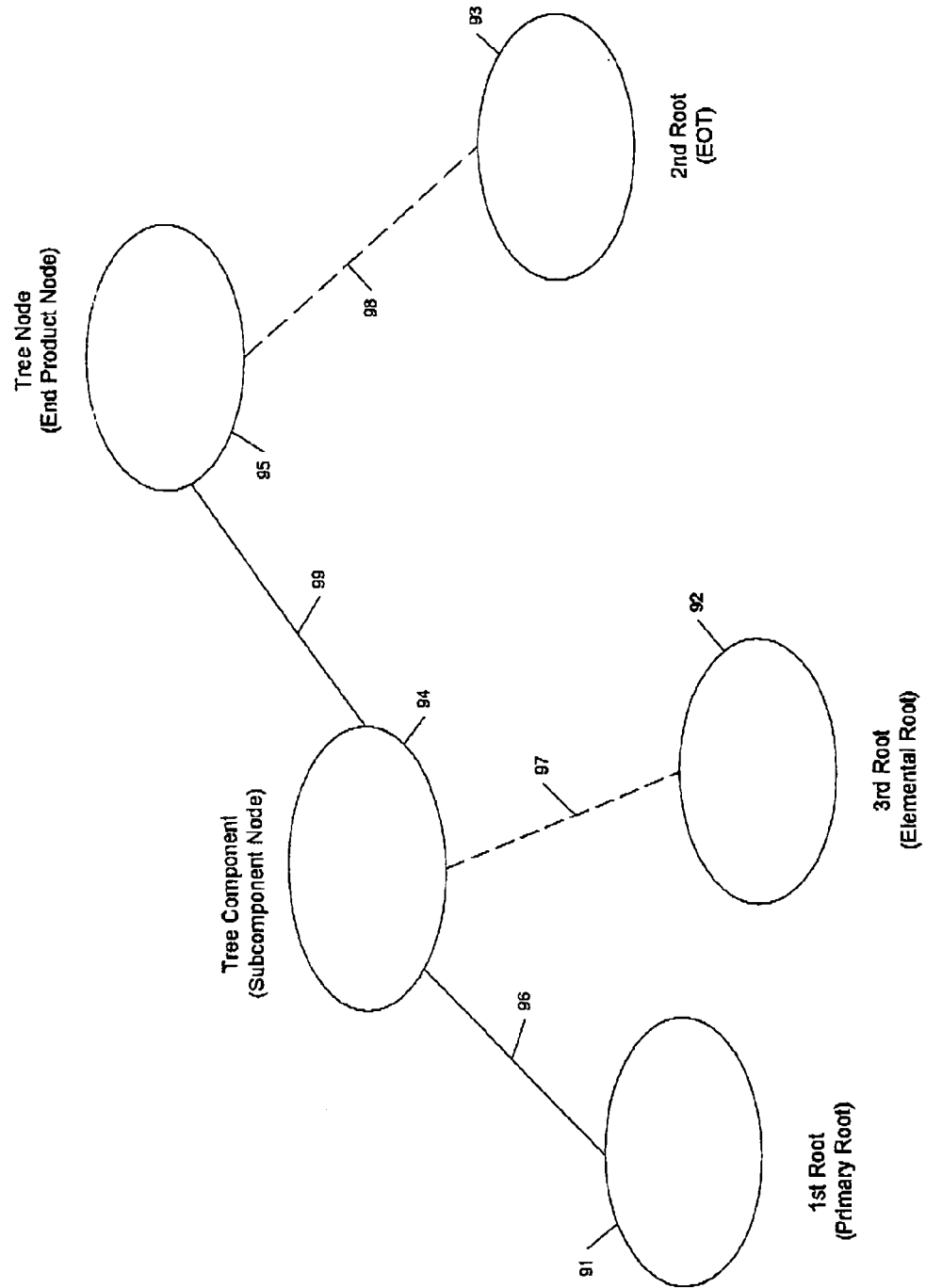
FIG. 10 is a block diagram illustrating a minimal structure of an interlocking trees datastore, which we call a KStore in accordance with embodiments of the invention.

In order to see the structure at its most basic form, please refer to FIG. 10 in which the smallest unit of the interlocking trees data store structure is pictured, having nodes 91–95, which are connected by links 96–99. The base structure will have a primary root (1st root, node 91) connected through a link 96 to a subcomponent node 94. A $3^{rd}$ root, (elemental root) node 92 will be connected also to subcomponent node 94 by a link 97. (Thus node 94 is a representation of whatever is indicated in the data, that is, node 94 represents an instance in the data of elemental node 91 followed by elemental node 92). Node 95 is connected to node 94 by link 99, and the path 91-96-94-99-95 may be called a path that begins at the primary root and tends at the end product node 95. (A path can be any connected line of links and nodes). The end product node is also an instance of a $2^{nd}$ root node (end of thought node) 93, and is connected to the path by link 98.

Each branch of the asCase tree of a given level begins with a combination of a node representing a level begin indicator and a node representing a root node into a subcomponent node. A subcomponent node may be iteratively combined with a root node into another subcomponent node. A subcomponent may be combined with a node representing a level end indicator to create an end product node. This process can be repeated and may result in the formation of multiple asCase tree branches depending from the first root.

For example, if the indivisible elemental root nodes or sensors of a particular interlocking trees structure are alphanumerics, subcomponent nodes may represent combinations of letters that are not words and end product nodes may represent words. Alternatively, subcomponent nodes may represent combinations of alphanumerics that comprise a partial stock number or order number and end product nodes may represent a complete stock or order number, to mention just two possible uses of many, of an alphanumeric universe of input applied to the invention.

End product nodes of one level may be the root nodes of a next level. The end product nodes may be used to generate a next level of subcomponents, in the same fashion that the dataset elements of the lower level are used to create lower level subcomponent nodes and end product nodes. For example, in the particular interlocking trees structure described above, the end product nodes of one level (representing words) can be the root nodes from which higher level end product nodes (representing a sentence) may be created. This process can be repeated any number of times, creating any number of levels of interlocking trees in the datastore.

Figure 11:
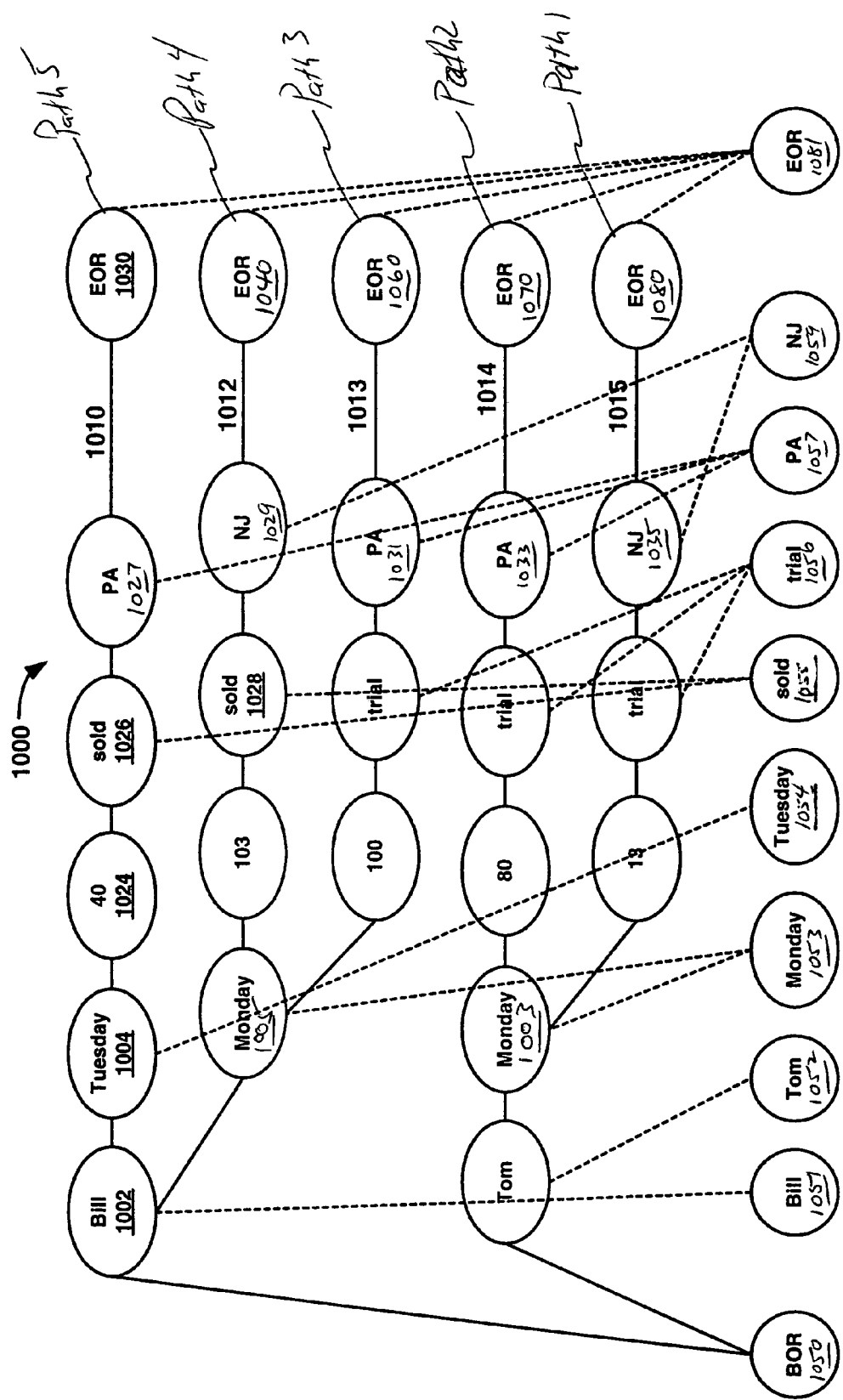
FIG. 11 is a block diagram illustrating a small KStore interlocking trees datastore, in accordance with embodiments of the invention.

Nodes such as root nodes 91, 92, and 93 in FIG. 10 and 1050–1059, and 1061 of FIG. 11 are referred to herein as elemental root nodes because these nodes represent dataset elements and comprise indivisible units from which divisible units (subcomponent nodes and end product nodes) are composed. Nodes such as 94, 1004, 1024,1033 and the like are referred to herein as subcomponent nodes because these nodes represent a combination of a root node representing concept indicator such as a begin indicator and a root node representing a dataset element, or a combination of a subcomponent node and a root node representing a dataset element that does not comprise an end product or a combination of a subcomponent node and a node representing an end indicator that does comprise an end product node. Nodes such as node 1030 or 95 represent end product nodes. In the example cited, elemental root nodes are letters, subcomponent nodes represent combinations of letters that do not comprise words and end product nodes represent words. It will be noted that the set of elemental root nodes includes "BOT", signifying, in the example, the beginning of a word, thought, or string, and "EOT", signifying the end of a word, thought, or string of nodes. It will be appreciated that "BOT" and "EOT" represent begin and end indicators to which the invention is not limited. The use of other such indicators is contemplated, as is the absence of one or both such indicators. In one embodiment of the invention, an end product node is distinguishable from a subcomponent node because of a link from the particular node to a root node representing the EOT concept.

If elemental root nodes represent letters in a first level of a KStore structure, a higher level, using words, sequences of letters, as the level root nodes in a KStore structure, could comprise sentences. Similarly, pixels as elemental root nodes for one level could comprise areas in a picture at a next higher level, and whole pictures at a yet higher level. Sentences may be combined to create paragraphs (a higher level yet than words), and so on. Additionally, root nodes of a higher level may be traversed into lower levels of the interlocking trees datastore. In one embodiment of the invention, the asResult tree that initiates from the level end indicator is used to define the root node of the next level. The end indicator is a second root into an inverted order of the interlocking trees datastore as defined by the asCase tree in one embodiment of the invention.

As nodes are created, bi-directional links are created between the new node and the 2 nodes that the new node represents. An Case link represents a link to the first of the two nodes from which a new node is created. The other pointer, to the new node is stored in the asCase list of the Case node. It will be appreciated that asCase branches of the asCase trees may be created by the generation of the asCase links as the input is processed. The asCase branches of each level provide a direct record of how each subcomponent node and end product node of the level was created. Hence the asCase branches can be used for any purpose for which knowing how subcomponent nodes and end product nodes are created is useful. If, for example, the input to the interlocking trees generator comprises a universe of correctly spelled words, the resulting asCase links of the generated interlocking trees could be used as a spelling checker, to list just one example out of many possible examples of the utility of the datastore.

A Result link represents a link to the second of the two nodes from which a new node is created. The generation of the asResult links creates a series of interlocking trees where each of the asResult trees depends from a root comprising a root node. This has the result of recording relationships between the root nodes and asCase trees in the datastore. That is, the combination of the asCase and asResult trees capture all possible contexts of the nodes of the interlocking trees. The combination of the asCase and asResult trees can be used for any purpose for which knowing the context or relationships between root nodes is useful. If, for example, the input to the interlocking trees datastore generator comprises a universe of sales data including salesman name, day of the week, number of items and state, the resulting asCase and asResult links of the generated interlocking trees datastore could be used to extract information such as: "What salesmen sell in a particular state?" "How many items were sold on Monday?" "How many items did Salesman Bob sell on Monday and Tuesday?" and the like,—all from the same interlocking trees datastore, without creating multiple copies of the datastore.

It will be appreciated that the aforementioned relational information is actually stored within the structure of the interlocking trees datastore that is built, rather than explicitly stored in the subcomponent and end product nodes of the tree. Because only the elemental root nodes of the interlocking trees datastore may include data, Case and Result links can be followed back to the root nodes to determine or reconstruct the original data from the data stream.

Exemplary Computing Environment

Figure 1:
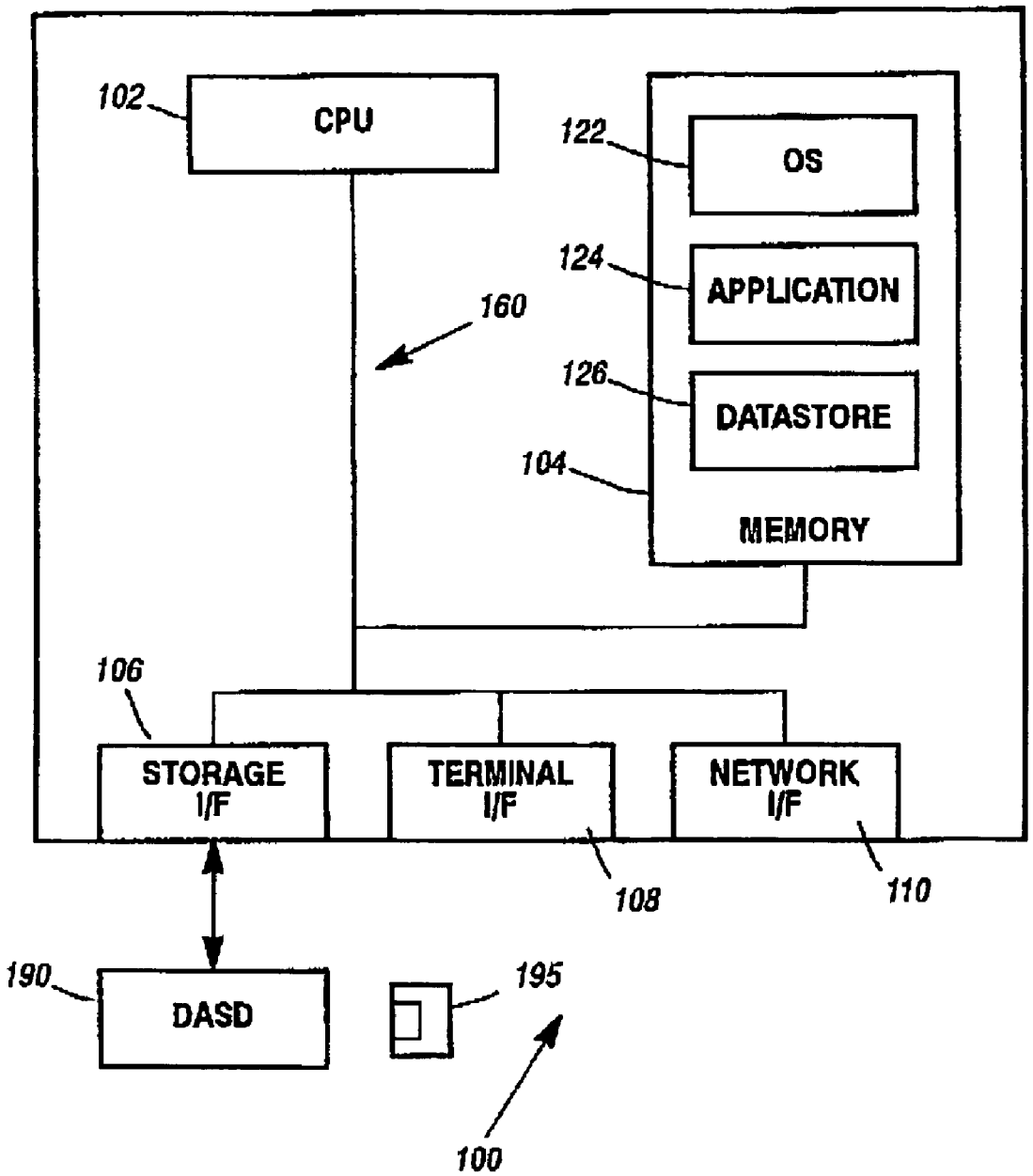
FIGS. 1 and 2 are block diagrams illustrating two phases of exemplary computing environments in which aspects of the invention may be implemented.

FIG. 1 is a block diagram of an exemplary computer system 100 in which aspects of the present invention may be implemented. Computer system 100 may be any suitable system, such as but not limited to a mainframe, minicomputer, IBM compatible personal computer, Unix workstation or network computer. One skilled in the art will appreciate that the apparatus of the present invention may apply to any computer system including but not limited to a multi-user computer system or single user computer. As shown in FIG. 1, computer system 100 comprises central processing unit (CPU) 102 connected to main memory 104, auxiliary storage interface 106, terminal interface 108, and network interface 110. These system components are connected via system bus 160. Auxiliary storage interface 106 is used to connect storage devices, such as but not limited to DASD devices 190, storing data on a disk such as but not limited to disk 195, to computer system 100.

Main memory 104, encompassing the entire virtual memory of computer system 100, includes an operating system 122 and an application 124, and may also include an interlocking trees datastore 126. The interlocking trees datastore 126 may be used to provide a data structure that can be quickly searched for data in multiple contextual modes without requiring a duplication of data. Computer system 100 may use well-known virtual addressing mechanisms that allow the programs of computer system 100 to behave as if they have access to a large single storage entity rather than access to multiple, smaller storage entities such as main memory 104 and DASD devices 190. Hence, while operating system 122, application 124, and interlocking trees datastore 126 are shown to reside in main memory 104, those skilled in the art will recognize that these elements are not necessarily all completely located in main memory 104 at the same time.

While computer system 100 is shown to include only a single CPU and system bus, one skilled in the art will understand that the present invention may be implemented using a system that includes multiple CPUs and/or buses. Terminal interface 108 may be used to connect one or more terminals to computer system 100. The referenced terminals may be dumb terminals or fully programmable workstations and may be employed to enable system administrators and users to communicate with computer system 100.

Network interface 110 may be used to connect other computer systems and/or workstations to computer system 100. The network to which network interface 110 interfaces may be a local area network (LAN), wide area network (WAN), an internet, extranet or the Internet, or any other suitable network. Operating system 122 may be an operating system such as OS/2, WINDOWS, AIX, UNIX, LINUX or any other suitable operating system.

Application program 124 can be any type of application program which accesses data stored in interlocking trees datastore 126. Thus, the application could comprise a data analytics application, data warehousing application, intrusion detection system, to name several examples, although the invention is not limited thereto.

Interlocking trees datastore 126 provides a data storage structure that enables users to access the same datastore to obtain information associated with any context. The term data, as used herein can include any type of computer stored information such as but not limited to numbers, text, graphics, formulas, tables, audio, video, multimedia or any combination thereof Interlocking trees datastore 126 can be implemented as part of application 124, as part of operating system 122 or as a separate datastore product that can be adapted to provide data storage for a wide variety of applications.

While the present invention is described in the context of a fully functional computer system, one of skill in the art will appreciate that the present invention is capable of being distributed as a program product in a variety of forms, and that the present invention applies equally, independent of the particular type of signal bearing media that carry out the distribution. Examples of media carrying such signals include but are not limited to floppy disks, hard drives, CD ROMs, digital and analog communication links over electrical, optical, wireless or other suitable mediums. It is also possible to distribute an interlocking trees datastore of the kind we work with here across computer systems if the need arises.

Figure 2:
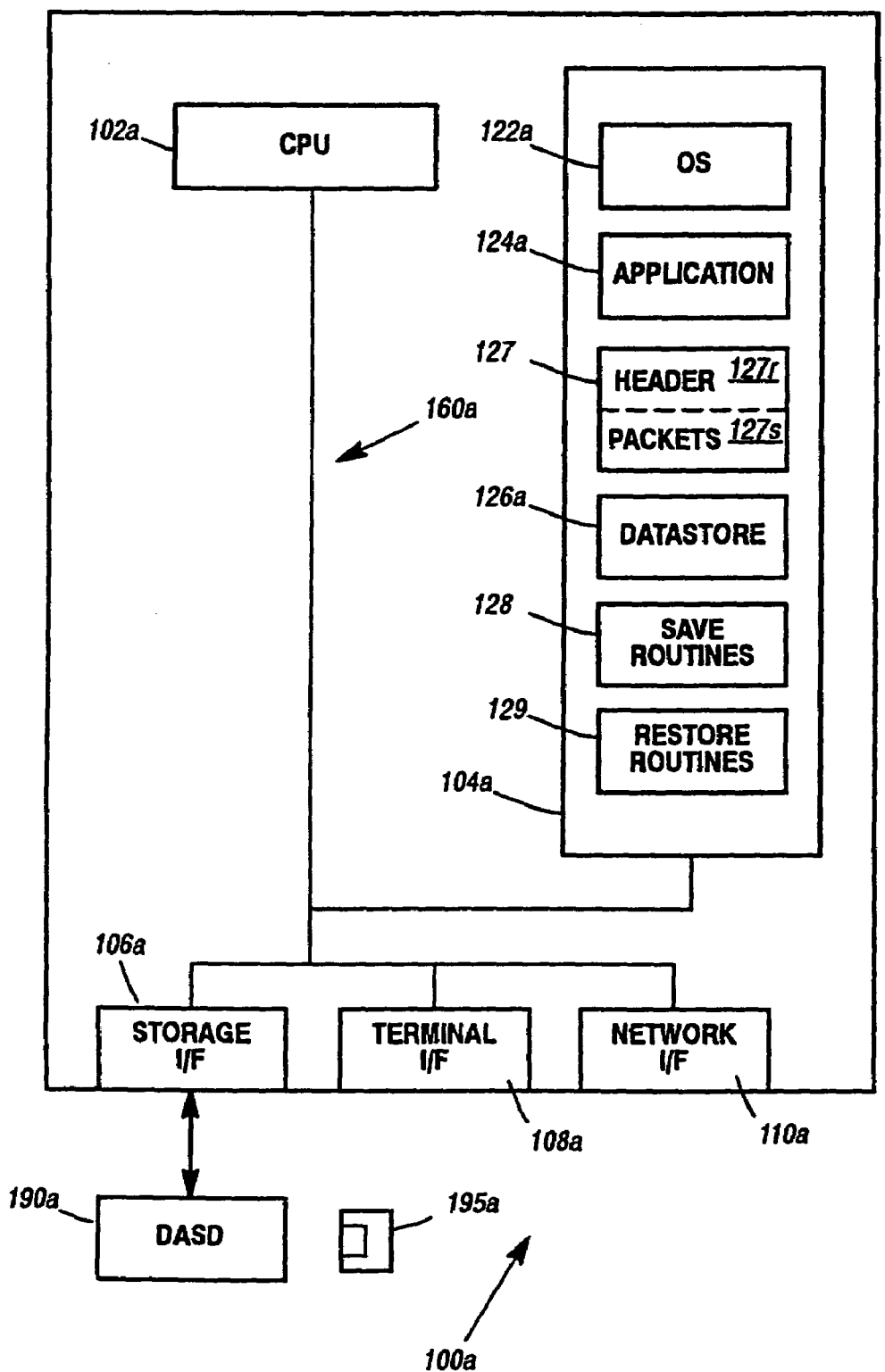

FIG. 2 is similar to FIG. 1 except it contains blocks representing a KStore being saved. Other, repeated elements of the diagram of FIG. 2 simply have an "a" annexed to their identifying numerals. The Kstore (Datastore 126*a*) is being worked by the Save Routines 128 now in the computer system's active memory 104*a*. To restore it after the save process has completed, there are also restore routines 129, which, for convenience are shown in the active main memory 104*a* also, although they can be swapped in when needed or as desired. The process will develop a header space 127*r*, and packets representing the nodes of the KStore structure as the process progresses, and will preferably work on the structure to be saved in active memory as area 127*s*. For convenient reference we refer to this work-space in memory as area 127. Alternatively, the space 127 can be very small, having only a currently in process node packet which is being created by the save routines 128, or alternatively being restored by the restore routines 129, if the KStore is being restored. If the KStore is being restored, space 127 may not be needed, but may be desirable as a test or working space where the KStore is being traversed and nodes are being added during the restore process. If the nodes are turned into packets and streamed as files out to memory as they are formed, they may be created at a speed at which they are streamed out immediately as stream files to permanent storage. In at least such cases, allocating memory for the packet in the storage device is not a required step, since a stream file set up will cause the OS and the data storage system to handle this automatically.

It will be appreciated that while in the text example given above ("BOT-C-A-T-EOT" and "BOT-T-A-B-EOT"), the universe of the input is the set of alphanumeric characters from which words can be derived, the KStore datastore structure is not so limited. For example, the universe of the input may be text, such as letters (from which words may be derived) or words (from which phrases or sentences may be derived). Also, the universe of the KStore may alternatively be comprised of amino acids from which a genome can be derived, limited resources used in a process, concepts, pixel sets, images, sounds, numbers, analog measurements or values or any other suitable universe which is composed of elemental units which can be digitized (or otherwise put into an information storage format, for example quantum state representations or the like) and sequentially combined to generate end products.

In addition to the above-described nodes, an interlocking trees datastore (using the illustration of FIG. 10 for example) may also comprise a number of connections or links between nodes, such as links 96, 97, 99, and 98. Links in one embodiment of the invention are bi-directional. Links 96 and 99 are referred to herein as asCase links. Links like 97 and 98 are referred to herein as asResult links. It may be recognized that in preferred embodiments of the invention, a root node representing a begin indicator concept or condition will have a null asResult list because a begin indicator will never be the second portion of a subcomponent, a root node representing a dataset element will have a null asCase list because a dataset element will never be the first portion of a subcomponent, and a root node representing an end indicator concept or condition will have a null asCase list because the end indicator will never be the first portion of a subcomponent. Finally, an end product root node will have a null asCase List because the end product acts as a dataset element for the next level.

All nodes of the interlocking trees data store may also include additional fields representing information associated with said nodes. This may be illustrated using FIG. 9. Note however that in nearly all preferred embodiments data is only stored in root nodes. Most nodes in most embodiments will likely not have string data even if they have additional fields. Usually additional fields (if any) may be used to store a count, or perhaps a node type indicator, if desired.

Figure 9:
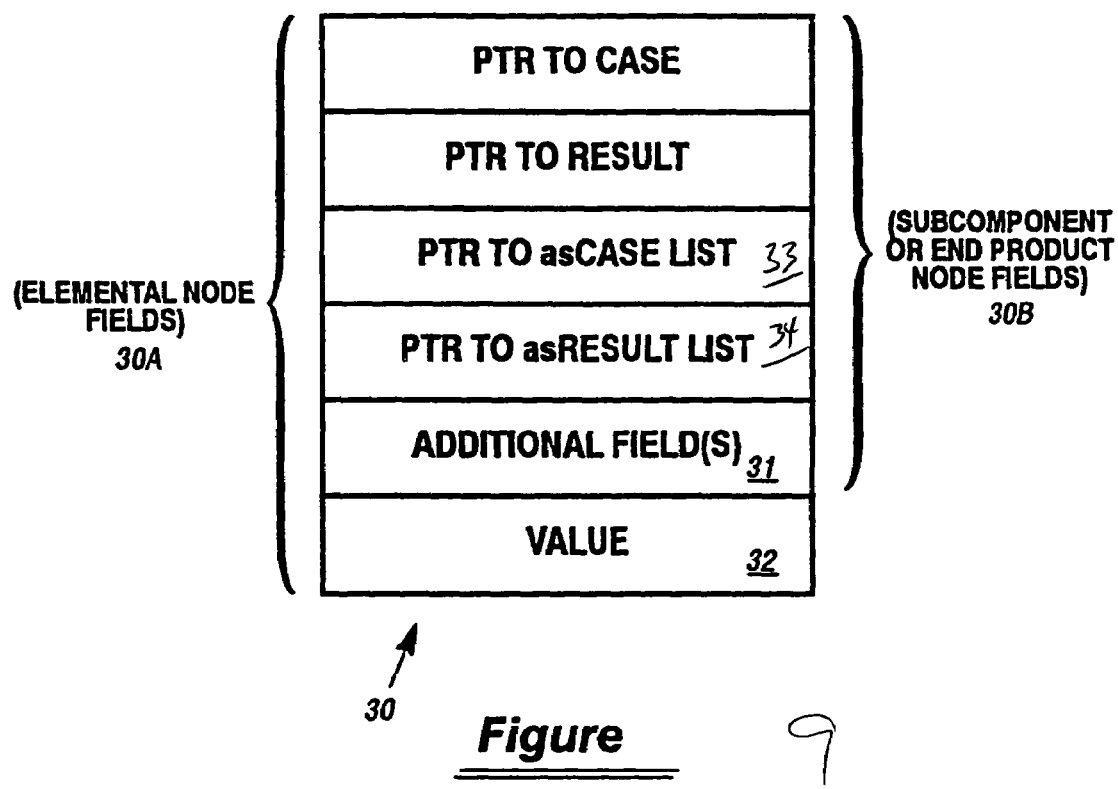
FIG. 9 is a block diagram illustrating the typical data structure of a node from an interlocking trees datastores in accordance with embodiments of the invention.

An exemplary node 30 is shown in FIG. 9. This node 30 may include a string field, as the additional field, that contains a sequence that shows all of the elemental root nodes represented by this node. The addition of a string field including this sequence of elementals is helpful in debugging. There can be many uses for such additional fields and the nodes such as node 30 need not be limited to one additional field. Typically however, the additional field, will contain a count rather than a string, and there can be more than one additional field. The number and nature of these fields will vary given the nature of the KStore one is building.

The exemplary node 30 may also include a count field as field 31. The count field is initialized and incremented with an intensity variable, whose value varies with conditions at times when the count field is being referenced. (An intensity variable is defined as a mathematical entity holding at least one unchangeable value). By making this term so broad the intensity variable populated count field can be used for applications of the inventive interlocking trees structure to processes dealing with forgetting erroneous recorded data, recording which entity is doing the inquiry, recording the type of inquiry being used, and other processes of interest which may be derived when using the data. A simple example form of an intensity variable would be a single ordinal field value, such as '1' to be used to increment or decrement count fields to record the number of times that a node has been accessed or traversed.

Further, recognize that the pointer to asCase List field 33 will be null for end product nodes and the pointer to asResult list field 34 will be null for all subcomponent nodes and that one of the two (i.e., the pointer to asCase List or the pointer to asResult list) will be null for the elemental nodes. This recognition allows for the creation of Type 3 node packets during Save operations as described elsewhere herein since we only need one field in the node packet since we know that one of the two fields will be null in all cases. This list count is to be distinguished from the counter field which maintains a record of the experienced frequency and intensity of the node.

Further, the intensity variable may change at different rates and in different directions for these various functions. A simple example of different intensities might be the addition of a value +1 each time a query traverses a node, and the addition of a value of −100 if a path containing that particular node (or that particular sequence of nodes) is deemed (for some overarching reason not of importance to this explanation) to be a mistake, such as when a sequence is found after use to have been a misspelling, or in the case of where a sensor finds an area containing a dangerous chemical, or if a human child simulator "touches" and "burns itself" on a hot stove in simulation. An alternative to intensity variables is to use a separate node to hold a new value for each kind of node traversal, thus creating a cluster in situations where a node is accessed during queries of type one, type two, experience one, experience two, etc, ad infinitum. In present thinking regarding real world applications of this structure, intensity variables in a count field provide the simplest and thus the current best approach to this problem, however, this or other alternatives should be considered and reconsidered as information processing systems mature. If this alternative is considered, an approach of using a separate node, possibly even an elemental or root node to record a count for the number of traversals of each type related to the node would be one way to implement this approach.

Thus, in one use, the count field may be incremented when new data is being incorporated into the interlocking trees data store but incrementing the count field may be omitted when the interlocking trees data store is being queried yielding a bigger value for new data and no change for inquiries. Accordingly, this intensity variable may be dynamically chosen for its suitability to the problem being addressed by the KStore.

The count field is added to facilitate use of the knowledge store instantiated by the interlocking trees structure and are particularly useful when statistics, such as frequency and probability are sought.

Additionally it should be recognized that if a count field exists in a node and corresponds to the experienced frequency and intensity of the node that if we wish to, we can eliminate any of those nodes from a save if they have a zero value in the count field. This elimination of null valued nodes can even be used for elemental root nodes with count fields of zero value, if, on examination, these elemental root nodes are not necessary for the use to which any likely restored Kstore would be put. (Thus, even low valued counts could be eliminated if desired; they do not have to be equivalent to a zero value). This could happen if a KStore developer has reserved a number of particles but finds that they are not useful once he has gathered most of his data; he could then eliminate these elemental root nodes with confidence. Also, in situations where there can be subtractions from the values in a count field, such nodes may also be eliminated from a save since they could represent errors or misspellings or the like. In some situations of course, one would want to never eliminate any nodes created and in such situations, one would save even those nodes with a null value in the count field to maintain the history.

Note that the node 30 in FIG. 9 can be an elemental node 30A having a Value field 32, or a subcomponent node or end product node 30B (which is missing the value field 32), but in either instance it may have an additional field or fields 31.

A specific instance of an additional field is shown in FIG. 9, where the node, such as node 30 (either an elemental node 30A (with a value field 32) or a subcomponent or end product node 30B) both have the additional field 31. This additional field (or fields if preferred) could contain any information desired. For example, one may want to know that this is a particular kind of node (node type like sensor, endproduct or other kind of node), or that it was created on a particular date or distance by node count from EOT or BOT, or whatever one wishes to do with it.

Figure 13:
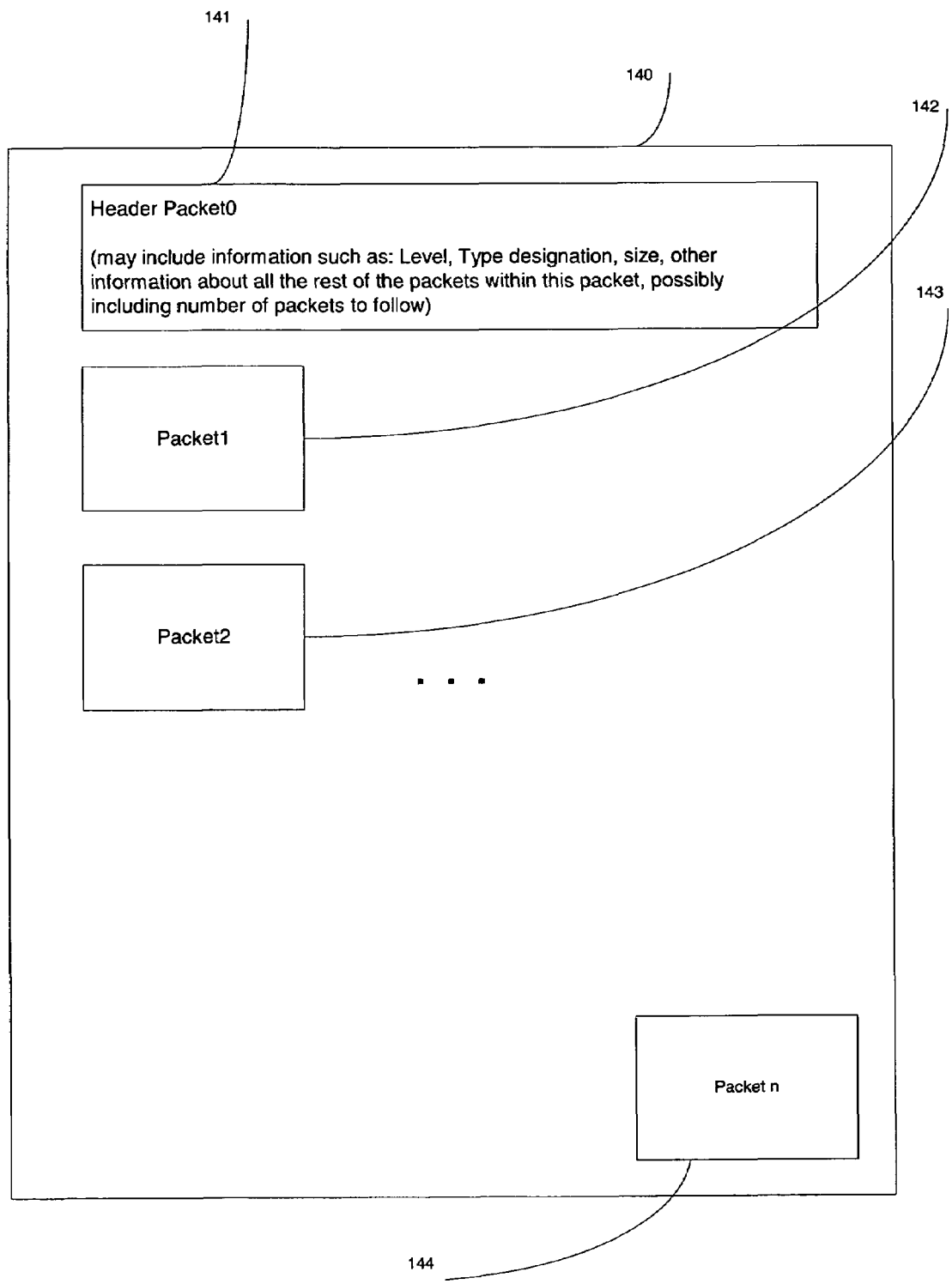
FIG. 13 is a block diagram for illustrating a packets within packets concept.

It is also useful to save packets within packets to assist with the organization of the save, if desired. In FIG. 13, we have a set of node packets 0 . . . n, 141, 142, 143, . . . 144, within a larger packet 140. Preferably the first of the packets 0 . . . n, packet 141, is a header packet, containing information about what is common to all the subsequent packets in the larger packet 140. This header packet is not reconstituted into a node in most preferred embodiments but contains information useful for the Restore process. Using this packet within packet design facilitates the storage of elemental root nodes, BOT nodes, and EOT and End Product nodes each in packets of their own, separately from the other nodes, since they will have different fields in each type. For example, an root node may have an asResult list, full of asResult pointers, but a subcomponent node would not have such a list. Also, layers of nodes could be stored together, again to facilitate the restore processing to easily organize the restoring of lower and then subsequently higher layers.

The taxonomy of types should be clarified. We have three new packet types that we described above. These packet types are distinguishable by virtue of having or not having one or two additional count fields that track the number of asResult or asCase links the original node had. These types may be used expediently to store nodes that have no asResult nor any asCase links if desired, but there are nodes that will not have these links. Such nodes are typically subcomponent nodes which will have a Case pointer, a Result pointer and a count field, as well as a pointer to the node with the asResult list of which it is a member and the asCase list of which it is a member. This could be therefore called a different type of node. However for this patent we use a Type designation of 1, 2, or 3 to designate what kind of information we are saving in the packet from which the nodes (some or all) of this KStore will be saved into during a save. The full definitions of the Type 1, 2 and 3 nodes is set forth above. If we are saving subcomponent nodes into a packet of nodes (as a packet within a packet), we would not need to designate a node type since it would not have either an asCase list, nor an asResult list.

It is useful here to discuss the concept of layers in a KStore in some detail, and to discuss how the restore can take advantage of this layering in some detail as well. We have described the use of layers in prior application U.S. Ser. No. 10/879,329, and have added a figure similar to the one used in that application here as FIG. 12. Note that the lowest layer builds words from the particle level which has elemental root nodes 902 that are letters. BOT 901 and EOT 903 are also elemental root nodes but special cases thereof. The words in the next layer up are all end product nodes 908, 906, and 904. The highest layer's end product node 902 is a sentence node, CATS ARE FURRY. BOS 904 and EOS 905 nodes are also root nodes of this layer, along with the word nodes 904, 906, and 908. Thus the root nodes will have asResult pointers into the layer above them.

Thus if we save and restore in order, we move from the bottom of the graph upward, starting from the BOT node 901. This points to case nodes of BOT C, BOT A (951), and BOT F, for each of the three words in this KStore at this level, ending in nodes 904, 906, and 908, respectively. To do this, we use the packets, finding the BOT first and simply put the old address for BOT into the address translation table, along with the new address allocated for this node in the (being) restored memory and move on to the elemental root nodes and do the same thing with their old and new addresses. The list of Elemental root node packets is C, A, T, S, R, E, F, U, and Y, (902), and the special case elemental root node EOT 903. We adopt their old and new memory locations into the address translation table as we just stated. As we restore the nodes which are Results of these elemental nodes, we have already established the addresses for these root nodes in the address translation table, so we know the new addresses to store for pointers to them in the nodes. The subcomponent node packets will also have their asCase pointers since their predecessors in the Case branches (here BOT, then C, then A, etc,) are restored first and have their new addresses already in the address translation table. We would then move to the next level, restoring the node BOS 904 for the sentence. We find that the subcomponent nodes have root nodes 904, 906, and 908, which are end product nodes on the Level 1 part of the KStore. The end product node would be node 902 for this level, and it also has an EOS node 905, which would be restored from a packet after the BOS node 904, preferably. Each of the nodes restored from packets for this second level would have their own new memory addresses, and their pointers would all point to the lower level nodes or the BOS and EOS nodes if restored in this one pass process just described. It is possible to restore a KStore without using the one pass process, but then you have to go back to fill in missing old address to new address conversions for pointers after a first pass, using some kind of place holders on the first pass. Such iterative processing is inevitably slower and unnecessarily complex.

There is a great deal of flexibility in implementation. For example, in a KStore, we may have AsCase lists and asResult lists implemented as linked lists. In another embodiment, the asCase lists and asResult lists can be allocated as blocks of contiguous memory locations of configurable size, such as but not limited to arrays. Knowing this information as one starts to do a restore is very important. The indication of the kind of organization such lists are in can be handled as a default or as some kind of metadata indicator put into the packet header, or headers or lead packets of large packets into which node packets are organized. In any event, there will likely be a pointer to any asCase list, set to the beginning location of the asCase list and a pointer to any asResult list. An appropriate algorithmic process for handling this metadata will be triggered by the metadata itself in preferred embodiments. A KStore can be organized to hold asCase and asResult lists in nodes, or, preferably, such lists (however organized) will have only pointers to them stored in the KStore structure. The count of the pointer lists stored in the node packets gives us the ability to allocate appropriate amounts of memory to restoring such packets as nodes with appropriately sized pointer lists. Since restore may be used to restore a K in an ordered manner, we don't have to store the asCase or asResult lists at all, so long as we will be careful about the order of restoring, because the restore will create these lists during the restore process. We do wish to have appropriately sized memory for it which is why we save the counts of pointers on the pointer lists.

In one embodiment of the invention of the previous version of our save and restore system (described in U.S. Ser. No. 10/759,466), in addition to recreating links from the new node to the nodes from which the new node is derived, a pointer to the location of the new node is added into the linked lists, asCase list and asResult list, of the nodes from which the new node is derived. The pointers may be added to the end of the list, to the beginning of the list, or may be inserted somewhere within the list. Additionally, a number of ordered lists may be maintained. For example, a node's asCase list may include a sequential list wherein pointers are added to the end of the linked list in addition to an ordered list wherein pointers are maintained in an order of most frequently accessed. It will be understood that although the example given cites one ordered list and one sequential list, the invention is not so limited, any combination and number of lists is contemplated as within the scope of the invention. An ordered list may be ordered by last update, last access, or frequency of update or access, or by any other suitable ordering rule. Information regarding this structure may need to be saved as metadata as well, and it is also considered KStore state variable information In the new invention described herein, we don't need to keep such lists at all, as will be demonstrated in the rest of this description, but one could decide to do so for particular cases if desirable in a given set of circumstances. However, when we don't keep the ordered list order, we lose the order, so there may be circumstances in which we want to keep the order and use the old method instead of this invention. Alternatively, we can restore the order of a list on some basis such as for a list based on frequency.

In most preferred embodiments of the KStore data structure, nodes representing the root nodes of the higher level do not contain data or representations of data or concepts; that is root nodes of a higher level contain only pointers to nodes in a lower level. Information about the root nodes of different levels would be another aspect of metadata that may be saved.

Any suitable number of levels may be generated. For example, in the world of text, levels may represent letters, words, sentences, paragraphs, chapters, books, libraries and so on. It will be understood that although in the exemplary figure, two levels of the interlocking trees datastore the KStore invention is not so limited. Any number of levels of the interlocking trees datastore can be constructed. Because the universe of this example is text, that is, combinations of letters from words (one level of end products), the result of the combination of words in this embodiment of the invention is a phrase or sentence (another level of end products). Sentences may be combined to form paragraphs, paragraphs may be combined to form chapters or sections and so on.

The elemental root nodes (sensors) and certain values associated with the elemental root nodes, need to be stored in order to restore the KStore properly. If the sensor values are saved independent of the nodes in the ordinary course of creating a KStore structure, these file(s) of values and the pointers back to the elemental root nodes can simply be saved as is (with accommodation for the addressing changes that might be needed for the pointers as described with respect to pointer addresses generally). In the case of a KStore where the sensor values are actually stored in the nodes, the values will be saved with the other elemental root node information when the nodes are saved during a save operation. Thus it will be apparent that the save process will be tailored to the KStore being saved.

It will be further understood that depending on the input universe, end product nodes may represent entities other than words, phrases, sentences and so on. To offer one example of many: if the input is a sequence of amino acids comprising a chromosome, one end product may represent a gene or an allele. In another example, pixel sequences may have end products that are lines, circles or other shape items.

Searching the KStore structure is relatively straightforward, has been described in previous patent applications, and a complete understanding of how to do so is not required for knowing how to save and restore the interlocking trees datastore that we call KStore. Nevertheless, a brief description is included for convenient reference.

Now consider that input for FIG. 11 comprises data records such as the following:

Bill Tuesday 40 sold PA
Bill Monday 103 sold NJ
Bill Monday 100 trial PA
Tom Monday 80 trial PA
Tom Monday 13 trial NJ In one embodiment of the invention, the dataset elements are comprised of fields of information separated by a delimiter such as but not limited to the blank character. In one embodiment, the dataset elements are derived from the input, although it will be understood that the invention is not so limited, as described above. Variables encountered thus far in the input data are salesman name, (Bill and Tom), days of the week (Monday, Tuesday), number of items (40, 103, 100, 80, 13), status (sold, trial) and state (PA, NJ). In one embodiment of the invention, the interlocking trees datastore 1000 of FIG. 11 will result from this input. In FIG. 11, for space reasons, the first portion of the node is not shown. For example, although node 1002 is labeled "Bill", node 1002 actually represents "BOT-Bill". Although node 1004 is labeled "Tuesday", node 1004 actually represents "BOT-Bill-Tuesday" and so on.

For example, in one embodiment of the invention, subcomponent nodes and end product nodes of paths including a desired sequence can be determined by following the pointers contained in the asResult list of the particular root node representing the desired sequence. The asResult list of the root node is accessed and each pointer in the list is followed to the subcomponent node associated with that root node. If end products are desired, the asCase branch tree is followed to the leaf node of the branch.

In one embodiment of the invention, a request for information is in the form of specifying constraints (which can be seen as either a "context" or a "focus" depending upon perspective). For example, a request for information may be in the form of a list of constraints. The list of constraints may be nested or independent. In one embodiment of the invention, the asResult list of the endproduct node of each listed constraint is found, paths for each node within each asResult list for each constraint are found, the paths are followed to their end products and the intersection of the end products for each path within each asResult list for each constraint is selected. Nested constraints are found by first constraining the datastore to retrieve a set of data which is then used as the set of data to be further constrained and so on.

Logical operators can be used in defining constraints. One can say that one is looking for nodes that identify persons, places AND things, wherein AND would be a logical operator specifying the joiner of sets of all persons, places and things, i.e., all nodes identifiable by the elementals or root nodes called "persons," "places" and "things." The interlocking tree structure given the query, what are all "persons" AND "places" that ARE (another logical operator) "things" would be constrained to answer by howsoever the item "things" are identified. If in constructing the structure, things never pointed to places, then all other "things" would not be found in the query, but all places known in the interlocking tree structure would be. If people were considered things when incorporated into the structure, they would be found in the query too.

Logical operators can take many forms, such as AND, OR, NOT, GreaterThan, XNOR, EqualTo, and the like, and may also be combined. All such logical operators and combinations thereof will be useable within this invention. Comparative mathematical expressions will also be useable, depending of course on context. Find all salesmen having sold more than 100 cars, might be a query depending upon a comparative mathematical expression for an example, where that expression would be salesmen having sales of cars being a number >100.

Figure 12:
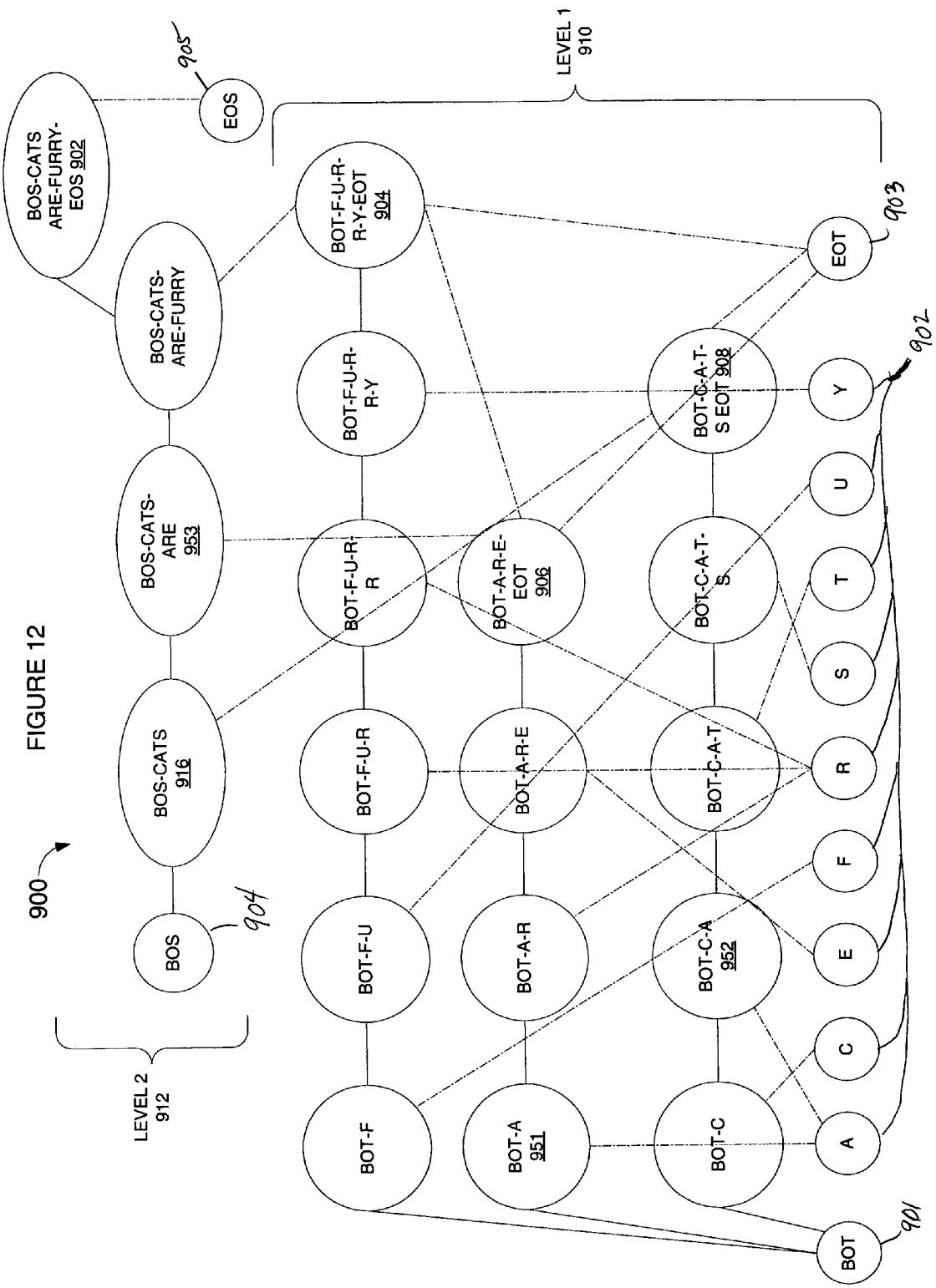
FIG. 12 is a block diagram of a KStore useful as a supporting illustration for a plurality of levels discussion.

In one embodiment of the invention, the focus may be used to determine the information that is saved. For example, in the case of a two-level datastore in which the sensors are letters (reference could be had to our CATS-ARE-Furry diagram, FIG. 12, level one end products comprise words and level two end products comprise sentences. If we want to save only sentences that have the letter A in them, we would constrain the K to those nodes with a connection to a root node of "A." Then we would have to traverse these words through their Case links from A, to find the end product word nodes, and from these we would need to check the asResult lists for each such word. Then we would traverse the Case links from sentences pointed to, to find the End Product nodes of the sentences they may be in to find the sentences that have the letter A in them. In FIG. 12 for A we would go to nodes 951 and 952, following their Case links to the end of those words 906 and 908, respectively. These nodes 906 and 908 have asResult pointers to nodes 953 and 916, respectively. Following the Case links from either of these nodes leads to the EOS node 902. Thus for this example we would save all the nodes in FIG. 12 but obviously if we had other letters and no words with A in them, those would be lost in such a partial save.

In one embodiment, by following the tree having the level begin indicator as its root, all end products beginning with a constraint can be found, (e.g., all the words beginning with a specified letter can be found. Similarly, all end products with a specified constraint, or a specified constraint in a specified position, (e.g., all the words that have a specific letter in them or all words having a specified letter in a specified column) can be found. Similarly, by following the tree having the level end indicator as root, all end products that end in a specified constraint can be found (e.g., all words ending in a specified letter.) A plurality of constraints and/or foci may be specified.

For a partial save, any constraints may need to be saved to indicate the limits of the partial save. Thus, relating this to FIG. 10's KStore, putting in the header "all information from Monday" would indicate that the saved KStore contains only information from Monday.

Referring now to FIG. 11, suppose the answer to the question of what is the total number of units sold on Tuesday is desired. It will be apparent to one of skill in the art that, instead of traversing all the nodes in the entire datastore, in one embodiment of the invention, retrieving this information requires only the retrieval of the asResult lists of root nodes 1054 and 1055. Path 5 to endproduct node 1030 is traversed because node 1004 is pointed to by the root node representing Tuesday 1054, and path 4 to endproduct node 1040 is traversed because node 1028 is pointed to by the root node representing sold 1055. Path 5 is also traversed because node 1026 is also pointed to by root node 1055 sold. Paths 1 1080,

2 1070 and 3 1060 do not have to be traversed. The intersection of the sets of end products returned from following paths pointed to by root nodes 1054 and 1055 comprises node 1030 representing Bill Tuesday 40 sold PA.

Nested constraints are found by first constraining the datastore to retrieve a set of data which is then used as the set of data to be further constrained and so on. To do a nested search, we start with one of the constraints, for example, SOLD, from root node 1065. Tracing back from the two identified endproduct nodes 1030 and 1040, we come to only one of them having a node TUESDAY, 1004, from the Case path from node 1030. Thus we get the same result with this alternative procedure.

Refer now to FIG. 3 in which a node packet containing the fields needed to store the information from a node in accord with an embodiment of this invention is described. The first field of the Type 2 node packet 220 is the packet length field 211. This field is not absolutely needed, but useful to have to step through when restoring packets into nodes, giving an indication of where the next packet will start. We will show this field in all the Type packets although in most cases the packet size will be fixed to a memory address for each field of the packet. The next field is the Case pointer field 212, relating of course, to the pointer to the Case node, node 30 from the FIG. 9 description. The next field is the Result pointer 213 containing the pointer to the Result node, from the node of FIG. 9. The additional field 214 is abbreviated here for simplicity and may include any additional fields as well as the value field from node 30 of FIG. 9. Field 215 contains the old node address.

The Type 1 node packet 200 is illustrated in FIG. 4. It has corresponding fields for packet length 201, Case pointer 202, Result pointer 203, Additional fields 204 and old node address 207. It also has fields for the asCase and AsResult pointer list counts 205 and 206. These counts can be used to help determine the total size of the memory needing allocation when we do a Restore. As mentioned before, the BOT and subcomponent nodes will have as Case pointer lists and only the root nodes will have as Result lists, so we really only need one count for the fields 205 and 206, however, if we use this Type 1 node, we have a simpler algorithm for processing the nodes into packets. Just to be clear, we define a root node as either an elemental root node (but not a BOT, which is a type of elemental root node) or an end-product node.

However, in any situation we could use Type 1 node packets we can also substitute for them Type 3 node packets which have a single field "Pointer List Count" list count to hold the count of either the asResult or the asCase list pointers. Thus in FIG. 5 the packet made from any node could be like packet 230, with packet length field 231, Case pointer field 232, Result pointer field 233, additional fields 234, Pointer List Count 235 and old node address field 237.

As may be recalled from the description of the preferred embodiments of the interlocking trees datastores of patent application Ser. Nos. 10/385,421, and 10/666,382, the asCase pointer list as well as the asResult pointer list, was not itself stored directly in the node, a pointer in the node indicated the area in which the list was stored. However, in our first Save and Restore invention, described in U.S. patent application Ser. No. 10/759,466, we preferred to save the asCase pointer list with the node that had the address of it. In using the preferred embodiment to save each node in order to be able to restore the interlocking trees datastores structure, the asCase and the asResult lists are not saved in this invention. Instead, the preferred embodiment of the Restore process restores without having to rely on saved lists of asCase and asResult pointers.

The current invention can also take advantage of three different types of node packets. A first type, Type 1 node packet, contains both an asCase list pointer count and an asResult list pointer count. A variation of Type 1, called Type 3, contains one Pointer List Count instead of the two pointer list counts (since one is going to be of a null value). The last type, Type 2 will not have any pointer list count at all. Thus the nodes which form packets of Types 1 and 3 will have asCase and/or asResult list and the nodes that will form Type 2 will not. To get these counts one has to go to wherever the pointer list is stored, and if in a linked list, by following the links or by some header information in the linked list obtain the count of pointers in this list. Accordingly, since it reduces both a step or more of processing, we generally prefer to use the Type 2 packets which do not require any use of these pointer lists. Again, if a Type 1 node packet is being constructed we will either have a counter for asCase or asResult pointer lists, but not both. Hence we also allow for use of a Type 3 node packet, which puts the non-null count, whichever type it may be into a field called Pointer List Count. Again, while it can be 30 appreciated that either node packet type may be utilized interchangeably, the type and the size of the asCase and asResult lists may create a situation where one implementation of a node packet type would be more efficient than the other node packet type. If the asCase and asResult pointers lists are implemented using arrays, are relatively large as determined by experience, or are built from a static database, the Type 1 or Type 3 node packets that contains the packet length, any additional fields, the Case pointer, the Result pointer, and either an Pointer List Count or the asCase and asResult pointer list counts as well as the old address of the node should be used. If the asCase and asResult pointer lists are implemented using short linked lists, are relatively small as determined by experience, or are built from dynamic databases, the Type 2 node packet that contains the packet length, any additional fields, the Result pointer, the Case pointer, and the old address of the node may be used.

It should be noted that the type of node (and thus also whether an Pointer List Count is asCase or asResult) can be determined by what it is linked to and what is linked to it, of course.

When allocating the memory needed for a restored K, we use the same process as we do when we initially created the K—For a linked list we allocate memory for a new link as we need it. For an array, we start with an initial size and then incrementally resize as necessary.

It is also possible to have a Save routine that creates two types of packets, the Type 1 and Type 2 or the Type 3 and Type 2, where it uses the Type 2 for subcomponent nodes and the Type 1 or 3 for the nodes with an asCase or an asResult list pointer. We can simply have the algorithm setting up the packets check to see which type of packet is optimal based on a read of the node. To be clear it would not be preferred to combine use of Type 1 with Type 3 packets in any event where we might want to have a combination, but we should note that it is not preferred to combine two types of node packets in a single saved K for reasons discussed previously. Subcomponent nodes have asCase lists, however, it's more likely that these will be smaller lists than those for elementals or end product nodes. So type 2 might be a better fit for those nodes in most likely circumstances.

Having become familiar with the basic structure of the units to be saved, an explanation of the process for making the save now follows.

Figure 6:
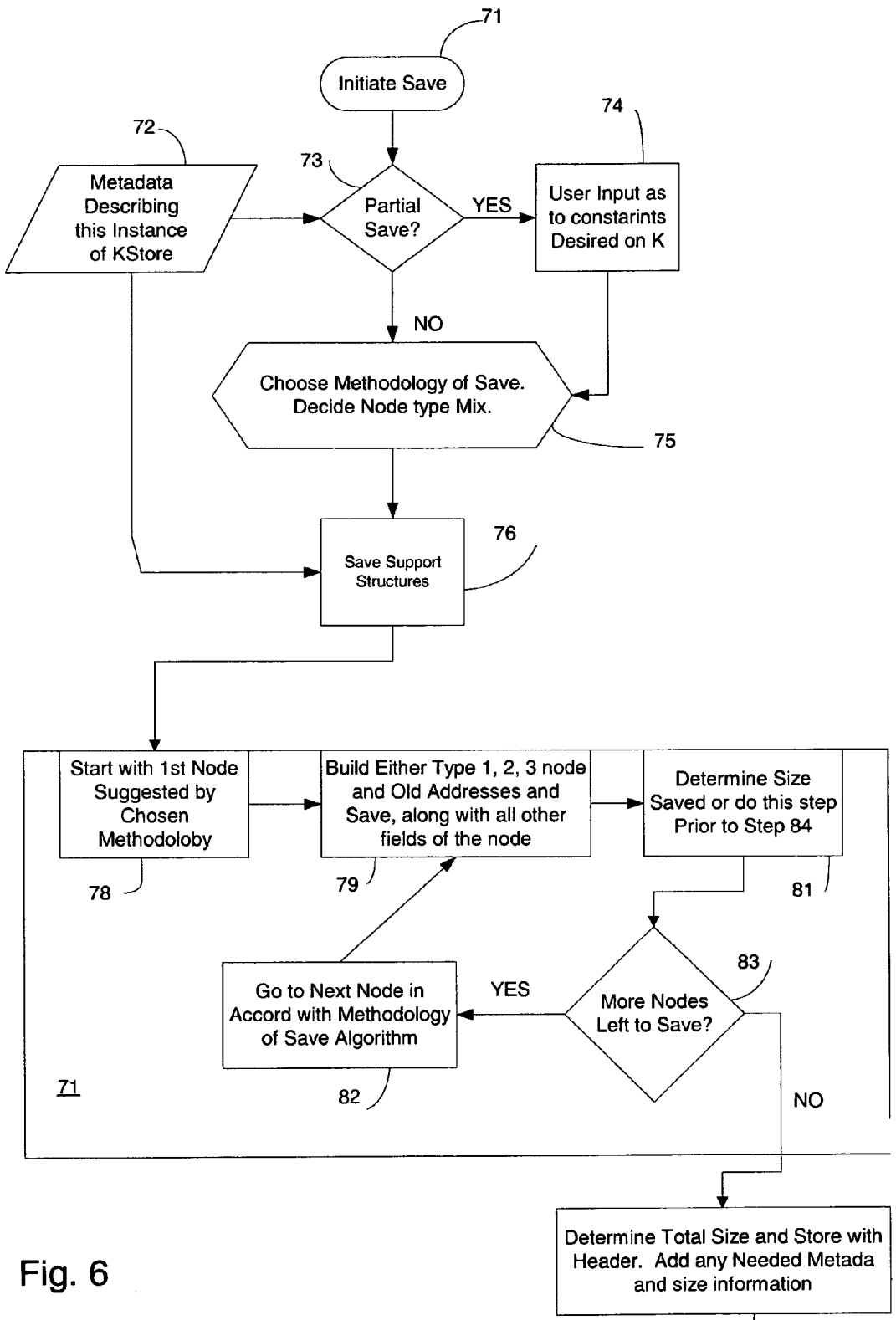
FIG. 6 is a flow diagram illustrating a preferred form of a save process in accord with the invention.

Refer now to FIG. 6 in which a flowchart 70 illustrates a preferred embodiment of the save portion of the invention. It begins when a user or system decides to initiate a save in step 71. A determination is made or indicated that a partial save or a full save is expected in query 73. In the construction of the KStore, a set of metadata 72 may have been created describing the particular KStore instance under consideration. Assuming that a partial save is selected, user input 74 (which could also be considered user input if it comes from an automatic system) as to the desired size, particulars of the root nodes and other aspects of the parts of the KStore necessary for the save will be available for this process.

In step 75, one of at least three methodologies is chosen in order to make a save of the Kstore data structure possible. If this is not a partial save, this selection of methodology will occur without any user input as to the constraints on the KStore data structure. The user can choose or it can be selected for him based on known parameters of the KStore. For example if it is known to be a K with very large asCase lists, the preferred method of saving may be to allow for these to be rebuilt on Restore, thus causing the selection of Type 2 node packets for all nodes, leaving out the need to track these lists. The user may select a more complex save algorithm which checks each node to see if it is one with a non-null value for the asCase list pointer or for the asResult pointer and choose to construct a Type 1 or Type 3 node packets where that value is non-null, but a Type 2 node packet for those nodes where that value is null. Or the method may select to use just Type 1 or Type 3 node packets, and store a null value where there is no asCase or no asResult list pointer in the node under examination. The other main aspect to methodology selection is to determine the order by which one traverses the K to find each of the nodes to be formed into packets.

Although it is possible to do later (such as in step 84 or near there), in the preferred forms of the invention, the supporting structures including various aspects of metadata should be saved first in step 76. In this step, we may save the information in the format of packet within packet described with reference to FIG. 13, above, or we can save such information in another way one of ordinary skill may find convenient. If we do use the packet within packet technology, or if we save in layers as also discussed above, or if we do both, we would follow the next steps for each layer and then return to step 76 to start saving the next layer. In saving the next layer, we would again save any information about all the nodes in this next layer before moving again to step 77 and the iterative process of saving all the nodes in this layer (or at least all the ones of the kind that belong in the packet, then the ones in other packets that might be built from this layer). In step 77, the nodes and the bulk of the KStore data structure will be saved. If a currently non-preferred methodology is chosen for saving the KStore structure, it is possible to complete step 77 in a single step; if a memory image can be saved with all of the memory addresses intact and restored to the same location, step 77 could be accomplished as a single step. However, this is not likely to be possible in the case of a partial save nor is it possible in situations where the KStore structure will be moved from one computer to another or where there is a lack of control over the exact location within the main memory to which the save structure can be restored. In step 77, the first step is to begin with the first node suggested by the chosen methodology in step 78 and to find the old address and save from the main memory of that node and save this along with specific fields of the node in step 79 depending on the type of node packet utilized. If Type 1 node packet is used, the Case pointer, Result pointer, additional fields, asCase pointer list count, asResult pointer list count and old address may be saved into the Type 1 packet. If using Type 2 node packet, the Case pointer, Result pointer, additional fields and old node address may be saved. In the preferred embodiment, the asCase and asResult lists are not saved, but are reconstructed as described in the preferred restore process described below. If Type 3 node packet is used, the Case pointer, Result pointer, additional fields, Pointer List Count pointer list count and old address may be saved. The size of the packet being saved for this node is preferably determined at this point so that the ultimate size of the stored data structure will consist of the header with its metadata resources and the data packets following there behind in serial fashion or other similar structure. Thus, step 81 being accomplished for each of the packets, a total of all the size of the packets can be immediately found by simply adding up the sizes of each of the packets as they are prepared.

If we are in a situation where the KStore is the only application that will use the computer system, it is possible to know that there won't be any intermediate IO functions occurring and accomplish the save in an atomic manner. However, this is not usually the case in the current environment of computer systems today. Thus, FIGS. 3–5 illustrates the intermediate data structure of the KStore packets and header of Types 1–3 illustrate the intermediate data structure of the Kstore packets of Type 2 packets and header being prepared to save in an atomic fashion (one packet at a time) to a disk drive or other permanent data storage device.

After preparing the node packet and determining the size of the node packet in steps 79 and 81, the question must be answered whether there are further nodes to save within this KStore in accord with the chosen methodology and/or within the constraints selected in step 74. Assuming the answer is yes, step 82 moves to the next node in accordance with the methodology of the save algorithm. These methodologies will be described later.

If there are no more nodes to save, the total size of the KStore structure that needs to be restored may be determined in step 84 following which the KStore structure is prepared to be saved and may be saved. This step could be taking place in a partial manner each time a node packet is created if counters are used, in which case this step may simply read the totals in the counters. For programming ease, one may index or label all the root nodes and EOT and BOT nodes, so that these can be found first in the Restore process to enable the restore from the nodes with the asCase and asResult lists first, thus simplifying the Restore process.

As mentioned briefly above with respect to step 75, there may be several ways to conduct a Save process. The method chosen may be selected as appropriate. Assuming we are not using a whole memory swap process, but a normal save, the process will have at least three steps before writing a node packet or packets in a group to permanent storage. There will be a saving of supporting structures, which could be an automated or user assisted process. There will have to be a traversing step, where the process accesses each relevant node (some nodes may be excluded in partial saves, but otherwise substantially all nodes will be accessed). The information from each node will then have to be converted into a packet for saving. Then the saving process can occur, employing any housekeeping systems employed as may be needed by the hardware and software in which this structure may be running requires.

Note that if one saves by starting at one level and moving to next higher levels, then the restore process can be executed in a single pass, whereas, if using any node packet type which does not save actual pointers to asCase and asResult nodes (which is all that are described in this patent) not doing a save that way may leave it difficult to reassemble the pointers without iterative processing.

The saving of supporting structures will first require determining which informational structures will be saved with the interlocking trees data store. This may include structures such as but not limited to; a file header containing a creation date, KStore file ID, and so on, a list of elemental root nodes, (or sensors), a list of strings representing BOT-EOT monads, or perhaps just the list of end of thought nodes (monads) contained in the interlocking trees data structure, metadata such as might describe the data structures of the underlying OS or computer system in which it resides, password protection if any, how lists of pointers are ordered in the nodes, and any information of that nature if needed to restore the structure or determine the addresses of information in the structure which is being saved. Additionally the header may save K state variables (such as how many additional fields are supported in a node, what kinds of queries may be going on, how the as Case and asResult lists are structured, data sources, switches and data streams) and/or data sources descriptors such as hooks identifying what sources to accept queries and or get information from and the like. Of course, all this data should be formatted for writing and retrieval as may be needed by the OS and other features of the computer system being used. Also, if the KStore will have XML formatting or access, that kind of information should be stored too, as the KStore itself will (probably) not know that information about itself.

Thus, to list the items likely to be found in headers,

Header Record may Contain:
creation date
version/cycle of Save program that created the save file
Hardware configuration (CPU type, etc)
OS—operating system
underlying structure information (size of fields)
sign structure information, if not saved below "other" structures, information
sensors
levels and associated delimiters
meta data—field types (including user defined types), column descriptions, permissions, etc
kState variables—switches, data streams, sign structure information(for instance special ordering for asCase list)
data sources (types, locations, affiliated data streams)—for learning new knowledge
security (administrator & user passwords, permissions, saved query locations, triggers)

Now we describe the alternative methods of traversing for saving the KStore interlocking trees datastore structures.

Traverse the interlocking trees datastore to access each node starting from the primary root, using a sequential tree traversal along the asCase paths for each primary root node. For example, if we started with the primary root node BOT 1050 in FIG. 11, we would first go to Bill, and get all his paths to EOT nodes 1030, 1040, and 1060, then to Tom and his EOT nodes until all links to EOT node 1061 are reached. At this point all the nodes will have been accessed, except for the elemental root nodes. Recall that we might have a file of elemental root node values and pointers and they can be accessed that way. A better example can be seen in FIG. 12. In our preferred embodiments using this diagram, we would start with the first level 910 and save the sensor (elemental root nodes) first, then the first level (words), then the next level (sentences), etc. Save sensors C,A,T,S,R,E,F,U,Y, along with BOT 901 and EOT 903. These will have all the asCase and asResult pointers, so all the old addresses for the KStore will be entered into the old address list if it is built during the save. Next we save the nodes for the words CATS, ARE, and FURRY, including all the subcompnonent nodes. Next we save the BOS and EOS root nodes from the second level 912. Here we save the new nodes between 904 and 905, and finally the end product node for the sentence layer 912, node 902.

Traversing the interlocking trees data store to access each node from endproduct nodes is a second method. They are all accessible through the EOT node 1061. Thus a partial save can be conducted by traversing the KStore, through the desired constrained list of endproduct nodes.

Traversing the interlocking trees data store to access each node from root nodes is a third way to traverse the interlocking trees datastore structure. Thus a partial save can be conducted by traversing the KStore, through the desired constraint list of root nodes, by following all the asCase links from each of the root nodes in the desired constraint list.

Restore Process Flow.

Figure 7:
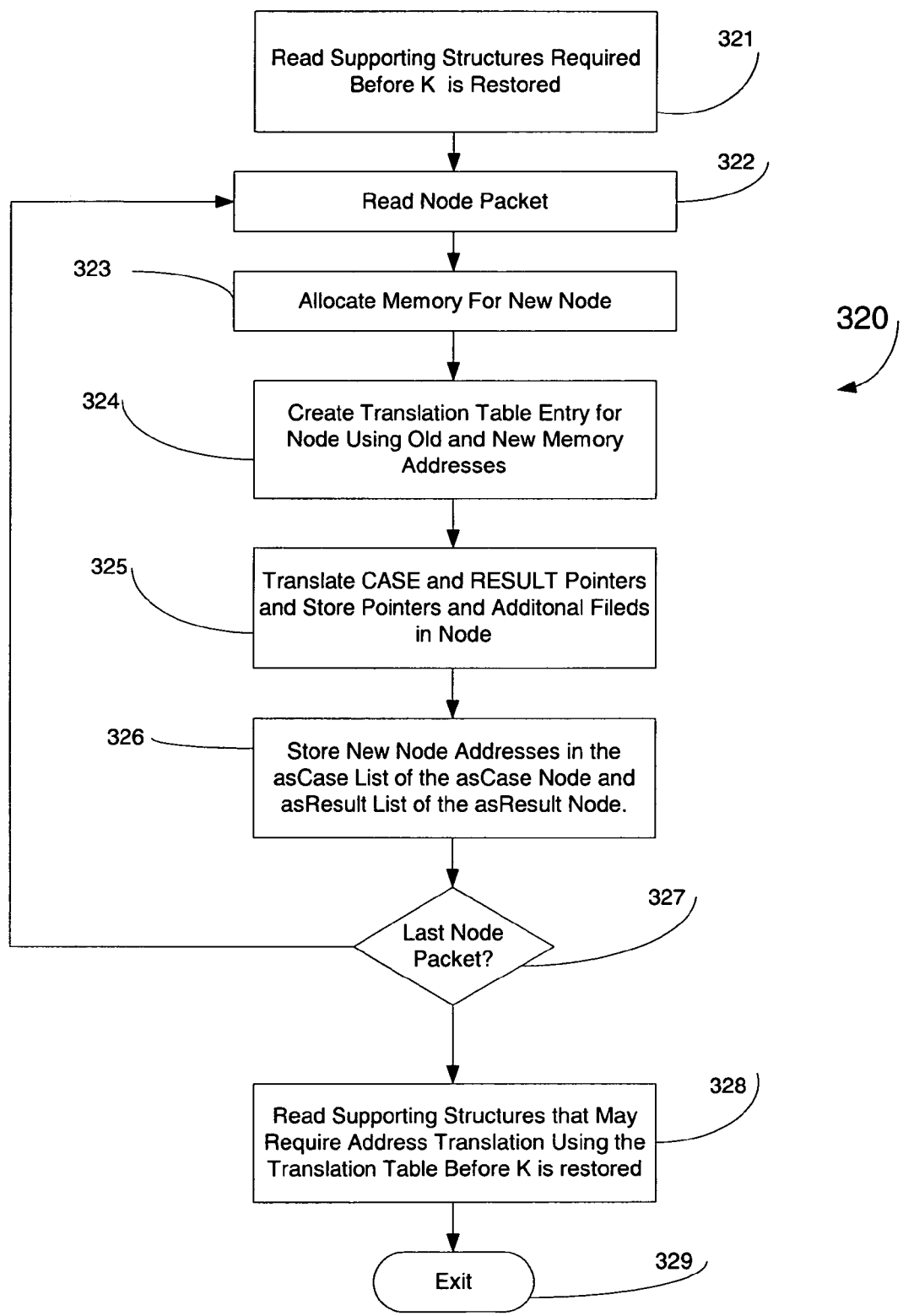
FIG. 7 is a flow diagram illustrating a preferred form of a restore process in accord with the invention.

FIG. 7 illustrates the preferred embodiment of the restore process 320 up until the process is completed. It could be dove-tailed into some other processes if desired. In the preferred embodiment of the restoration process, we first read supporting structures required before the interlocking trees datastore (here abbreviated as K) is restored 321. This may include such information as which particles are known to this K (sometimes referred to as a elemental root nodes or sensors or a sensor list), what size allocation is required in memory for this K, whether there are internal triggers and other functions that may be handled by a KEngine that addresses this K, and the like. If we are in a situation where the user always restores the same supporting structure to the same kind of KStore, this step may be superfluous in that it would be assumed to be restored with the same supporting structures each time. Given that KStores do not currently have wide usage, we prefer to use process 321 as a standard unless and until such time or for such circumstances for which it is not useful. To restore the interlocking trees datastore, we must restore all node packets and since they are stored seriatim, restoration in its easiest form would be through a serial restore in the same order from which they were created on a Save. We prefer to start with those nodes having asCase or asResult lists referencing nodes already restored, to speed up the Restore process by avoiding iterative searching for changes from former addresses in pointers to old memory locations to new memory locations during the Restore. One of ordinary skill in the programming arts will understand that this discussion describes several ways to do this Restore operation without resorting to undue experimentation to create the code needed to execute these ways, especially when read together with the following few paragraphs.

Accordingly, first we read the first node packet 322 and use the operating system of the computer we are working on to allocate memory for this new node in step 323. After allocation of memory for the node 323, we create or begin to create 324 the translation table and the translation table entry for this node using the old memory address which was stored with the node packet and the new memory address which the operating system or computer system just assigned to this node (See FIG. 7).

As an aside, it should be recognized that for machines and operating systems that can transparently and reliably move whole blocks of memory the size of the datastore under consideration as a single unit assigned to the same memory addresses, in such systems there is no need for the detailed save and restore process described here, although it may be useful for partial saves and to reduce the size of the storage required over such whole block saves. However, at the present time there are some memory file types which have been discussed but are not fully implemented and accordingly resort to more complex save and restore mechanisms such as are described in this invention are required.

Once the node table entry, containing the old address and the new address of the node, has been created and entered into the translation table 324, we then proceed to step 325 where we translate the Case and Result pointers and store the translated Case and Result pointers in the new node, along with any additional fields. For this version of the Restore, we look up the old addresses for the Case and Result pointers immediately. We intentionally saved them in such an order that they will appear in our translation address list prior to needing them.

As described above, a preferred embodiment of this invention does not save the asCase list or asResult list, but instead either saves nothing related to them or, alternatively, a count of the pointers on the list(s). To rebuild the asCase list and the asResult list, and their respective pointers, the restoration process proceeds to step 326. In Step 326, the restore process stores the new node address in the asCase list of the Case node and stores the new node address in the asResult list of the Result node of the node being restored. The new addresses of the first nodes to be restored, i.e., the EOT nodes and the other types of elemental root nodes, are preferably established as a part of step 321, so that when new nodes are established from node packets, they can be pointed directly to the new addresses for these EOT and elemental root nodes without a second iterative process, although such processing is not outside the scope of this invention, just not preferred.

Once the new node address has been stored in the respective asCase or asResult lists, the preferred method of restoring proceeds to step 327, whereby it is determined if the node packet in question is the last node packet to be restored. If the node packet is not the last node packet to be restored, the process continues with step 322 and a new node packet is processed. If the last node packet has been processed, then we can move beyond the question at step 327. This is an iterative process that continues until the last node packet is reached in question 327. At this point the interlocking trees data structure should be restored to the new memory.

An address translation table 40 is illustrated in FIG. 8. In it an old memory address list 41 is shown corresponding to new memory address list 42 such that for example an old memory address 1 (41a) will correspond to a new memory address 1 (42a) and so on Thus, every time an old memory address is being used, that is, restored, the new address into which the node/packet being restored is being loaded into is going to be maintained in the memory address translation table 40, linked to the old memory address. Any additional support structures that may require reference to this address translation table will be set up preferably after this table is complete in step 328. At this point we have a restored K and can exit this process 329.

Additionally, in reconstruction of a KStore, i.e., restoring it, the data from the elemental root nodes can be restored first, thus making the process of performing the restore quicker since the establishment of elemental root nodes will establish a large network of links quickly.

The methods and systems described above may be embodied in the form of program code (i.e., instructions) stored on a computer-readable medium, such as a floppy diskette, CD-ROM, DVD-ROM, DVD-RAM, hard disk drive, or any other machine-readable storage medium including yet to be available optical and nanotechnology storage and the like, since the medium should not change the operations of the structure nor the methods from what has been described herein. In all such data storage when the program code is loaded into and executed by a machine, such as a computer, the machine becomes an apparatus for practicing the inventive methods and provides a form of the inventive system as described herein. The present invention may also be embodied in the form of program code that is transmitted over RF or some transmission medium, such as over electrical wiring or cabling, through fiber optics or in the clear optics, over a network, including the Internet or an intranet, or via any other form of transmission, wherein, when the program code is received and loaded into and executed by a machine, such as a computer, the machine becomes an apparatus for practicing the inventive methods and provides a form of the inventive system as described herein. When implemented on a general-purpose processor, the program code combines with the processor to provide a unique apparatus that operates analogously to specific logic circuits, which themselves could be used for the invention. The program code may be implemented in a high level programming language, such as, for example, C, C++, or Java Alternatively, the program code may be implemented in assembly or machine language. In any case, the language may be a compiled or an interpreted language.

It is noted that the foregoing examples have been provided merely for the purpose of explanation and are in no way to be construed as limiting of the present invention. For example, the KStore interlocking trees datastore can be implemented using object-oriented technologies, procedural technologies, a hybrid thereof or any other suitable methodology. Furthermore, although the examples presented show the dataset elements stored in a memory of a computer system, one of skill in the art will understand that this functionality can be implemented in many different ways, and can be used in specific purpose devices as well as general purpose computer systems. For an example of the many different embodiments contemplated, the invention contemplates the use of many different sets of dataset elements of many different universes stored on multiple remotely located machines.

What is claimed is:

1. A method of restoring an interlocking trees datastore from a saved interlocking trees datastore data file, wherein said method of restoring comprises:

from said saved interlocking trees datastore data file, retrieving supporting information, wherein said saved interlocking trees datastore data file has at least one packet for each node to be restored, wherein said interlocking trees datastore after being restored has at least one elemental beginning root (BOT) node, at least one subcomponent node and at least a plurality of root nodes, wherein BOT nodes have a list of asCase pointers to subcomponent nodes, wherein said subcomponent nodes have a list of asCase pointers to other subcomponent nodes and wherein said root nodes have a list of asResult pointers to subcomponent nodes that depend from said BOT node, establishing an area in memory based upon at least some of said supporting information, iteratively reading node packets from said saved interlocking trees datastore data file until all node packets are read, and for each node packet read, allocating memory and having a new memory address assigned for new nodes created from read node packet in a main memory store on a computer system, creating an address translation table for each read node packet and adding information including at least an old memory address of said read node packet to said address translation table, said address translation table having a correspondence between said new memory address for each node packet from said allocating, and said old memory address for said read node packet, wherein prior to said reading, a determination is made as to what type of node packets is to be read, and said determination is made based upon reading a supporting information about node packets, and wherein said restoring an interlocking trees datastore from a saved interlocking trees datastore data file is based on said creating address translation table and said adding of information.

2. The method of claim 1 further comprising using said address translation table old memory addresses to find new memory addresses for nodes being created from any of said read node packets that have been previously read.

3. The method of claim 1 wherein said iteratively reading node packet steps are first performed on BOT and elemental root nodes before being performed on subcomponent nodes or end product nodes.

4. The method of claim 1 further comprising reading final supporting structural information from said data file after a last node packet from said data file is read, wherein said final supporting structural information is of a nature that depends upon having previously established node addresses.

5. The method of claim 1 wherein said node packets in said data file have been arranged during a Save operation precedent to said method, in such a way as to contain header information, said header information comprising metadata about said data file, said metadata providing identifying information to facilitate said reading such that said reading first read said identifying information in order to decide the order of node packet reading for all packets in said data file.

6. The method of claim 1 wherein said node packets in said data file have been arranged in large packets during a Save operation precedent to said method, said large packets containing header information, said header information comprising metadata about said node packets for all node packets in said large packet.

7. The method of claim 6 wherein several large packets present in a data file is read in order such that large packet containing a lowest level BOT node packet is read first and within each said large packet a BOT node packet and elemental root node packets are read first, and then large packets containing other node packets are read before reading node packets in a next large packet, and wherein all large packets on one level are read before reading any large packets having node packets on a level above said one level.

8. The method of claim 1 wherein prior to said reading, a determination is made as to what type of node packets is being read, and said determination is made based upon examining a first packet from a large packet, said first packet containing metadata about all node packets in said large packet.

9. A set of computer instruction encoded in a computer readable storage medium within a computer causing said computer to perform the method of claim 1.

10. A computer readable storage medium containing digitally encoded data for computer instructions and data containing the set of encoded computer instructions that when executed by a programmable processor performs the method of claim 9.

11. A computer system having a programmable processor and corresponding data memory, the computing system running a set of encoded instructions to perform the method of claim 1.

* * * * *